(12) United States Patent
Tanaka et al.

(10) Patent No.: US 8,759,739 B2
(45) Date of Patent: Jun. 24, 2014

(54) OPTICAL SENSOR AND DISPLAY APPARATUS

(75) Inventors: Kohei Tanaka, Osaka (JP); Christopher Brown, Oxford (GB)

(73) Assignee: Sharp Kabushiki Kaisha, Osaka-shi (JP)

( * ) Notice: Subject to any disclaimer, the term of this patent is extended or adjusted under 35 U.S.C. 154(b) by 389 days.

(21) Appl. No.: 13/377,100

(22) PCT Filed: Jun. 15, 2010

(86) PCT No.: PCT/JP2010/060120
§ 371 (c)(1),
(2), (4) Date: Dec. 8, 2011

(87) PCT Pub. No.: WO2010/147115
PCT Pub. Date: Dec. 23, 2010

(65) Prior Publication Data
US 2012/0091321 A1    Apr. 19, 2012

(30) Foreign Application Priority Data

Jun. 16, 2009   (JP) ................................. 2009-143298

(51) Int. Cl.
*G01J 1/44*    (2006.01)
(52) U.S. Cl.
USPC ....................................................... 250/208.1
(58) Field of Classification Search
CPC ....... H01L 31/10; G02F 1/133; G02F 1/1362; G09F 9/30
USPC ................. 250/208.1; 345/207; 257/290–292
See application file for complete search history.

(56) References Cited

U.S. PATENT DOCUMENTS

| | | | |
|---|---|---|---|
| 6,636,069 B1* | 10/2003 | Muljono | 326/30 |
| 2004/0041077 A1* | 3/2004 | Fossum | 250/208.1 |

(Continued)

FOREIGN PATENT DOCUMENTS

| | | |
|---|---|---|
| JP | 2006-3857 | 1/2006 |
| JP | 2006-118965 | 5/2006 |

(Continued)

OTHER PUBLICATIONS

Nakamura, T., et al. (2005). "21.4L: Late-News Paper: A Touch Panel Function Integrated LCD Including LTPS A/D Converter," *SID 05 Digest*:1054-1055.

(Continued)

*Primary Examiner* — Seung C Sohn
(74) *Attorney, Agent, or Firm* — Morrison & Foerster LLP

(57) ABSTRACT

Provided are an optical sensor having a wider dynamic range with reduced temperature dependence, and a display apparatus in which these optical sensors are used. An optical sensor includes an accumulation node (INT); a reset signal line (RST); a readout signal line (RWS); a photodiode (D1) (photodetecting element); a photodiode (D2) (reference element) that has a light-shielding layer; a thin-film transistor (M1) (first switching element) that outputs a potential of the accumulation node (INT) in response to the readout signal during a sensing period; and a thin-film transistor (M2) (second switching element) that is provided between the accumulation node (INT) and the photodiode (D2), and that electrically separates the accumulation node (INT) from the photodiode (D2) when the potential of the accumulation node (INT) upon supply of the readout signal is higher than a potential on a side of the photodiode (D2) opposite to the accumulation node (INT).

15 Claims, 16 Drawing Sheets

(56) References Cited

U.S. PATENT DOCUMENTS

| | | | |
|---|---|---|---|
| 2005/0045881 A1 | 3/2005 | Nakamura et al. | |
| 2007/0268206 A1 | 11/2007 | Kinoshita et al. | |
| 2010/0059660 A1 | 3/2010 | Satoh et al. | |
| 2010/0140452 A1* | 6/2010 | Vampola et al. | 250/206 |
| 2010/0164638 A1* | 7/2010 | Saw | 331/111 |
| 2011/0096049 A1 | 4/2011 | Katoh et al. | |

FOREIGN PATENT DOCUMENTS

| | | |
|---|---|---|
| JP | 2007-18458 | 1/2007 |
| JP | 2007-81870 | 3/2007 |
| JP | 2007-304245 | 11/2007 |
| JP | 2007-310628 | 11/2007 |
| WO | WO-2008/143216 | 11/2008 |
| WO | WO-2010/001929 | 1/2010 |

OTHER PUBLICATIONS

Koide, S., et al. (2006). "LTPS Ambient Light Sensor with Temperature Compensation," *IDW* '06:689-690.

International Search Report mailed Jul. 13, 2010, directed to counterpart International Application No. PCT/JP2010/060120; 2 pages.

* cited by examiner

OPTICAL SENSOR AND DISPLAY APPARATUS

REFERENCE TO RELATED APPLICATIONS

This application is a national stage application under 35 USC 371 of International Application No. PCT/JP2010/060120, filed Jun. 15, 2010, which claims the priority of Japanese Application No. JP2009-143298, filed Jun. 16, 2009, the contents of which prior applications are incorporated herein by reference.

FIELD OF THE INVENTION

The present invention relates to an optical sensor having a photodetecting element such as a photodiode, and to a display apparatus provided with these optical sensors in its pixel region.

BACKGROUND OF THE INVENTION

Conventionally, an optical-sensor-equipped display apparatus has been proposed that is made capable of detecting a brightness of external light and capturing an image of an object approaching its display panel by providing photodetecting elements such as photodiodes. Such an optical-sensor-equipped display apparatus is supposed to be used as a display apparatus for two-way communication, or a display apparatus having a touch panel function.

In the case of a conventional optical-sensor-equipped display apparatus, when known composing elements such as signal lines and scanning lines, TFTs (thin film transistors), and pixel electrodes are formed through semiconductor processing, photodiodes and the like are formed on an active matrix substrate through the same processing (see JP 2006-3857 A, and "A Touch Panel Function Integrated LCD Including LTPS A/D Converter", T. Nakamura et al., SID 05 DIGEST, pp. 1054-1055, 2005).

Further, it is known that a sensor output largely depends on an ambient temperature in an optical-sensor-equipped display device. In other words, there is a problem that when the ambient temperature varies, the characteristics of photodetecting elements fluctuate with the variation, which results in that variation of a light intensity cannot be detected correctly. Such a temperature dependence of an optical sensor is ascribed to a dark current (also referred to as a leak current). As a configuration for calibrating a dark current component in an output of an optical sensor, the following configuration is known: on an active matrix substrate, a light-shielded photodetecting element for detecting only a dark current (reference element) as a so-called dummy sensor is provided in addition to a photodetecting element for detecting an intensity of incident light (photodetecting element) (see JP 2007-18458A, JP 2007-81870 A, and "LTPS Ambient Light Sensor with Temperature Compensation", S. Koide et al., IDW '06 pp. 689-690, 2006). In this conventional configuration, an output from the reference element reflects the dark current component. Therefore, a sensor output with temperature dependence reduced can be obtained by, in a circuit at a later stage of the optical sensor, subtracting an output of the reference element from an output of the photodetecting element.

SUMMARY OF THE INVENTION

However, in the case where the photodetecting element and the reference element are provided in a pixel region, an output from the photodetecting element contains both components of an electric current generated due to incident light and a dark current. Therefore, there is a problem that if an increase in a dark current at a high temperature is taken into consideration, a dynamic range of an optical sensor cannot be widened.

In light of the above-described problems, it is, therefore, an object of the present invention to provide an optical sensor having a wide dynamic range and reduced temperature dependence even in the case where a photodetecting element and a reference element are arranged in a pixel region, and to provide a display apparatus that includes such optical sensors.

An optical sensor according to one aspect of the present invention includes: an accumulation node; a reset signal line for supplying a reset signal to the accumulation node; a readout signal line for supplying a readout signal to the accumulation node; a photodetecting element that is connected to the accumulation node and through which an electric current flows according to an amount of received incident light; a reference element that is connected to the photodetecting element via the accumulation node and that has a light-shielding layer with respect to incident light; a first switching element that outputs a potential of the accumulation node in response to the readout signal, the potential of the accumulation node varying with the electric current flowing through the photodetecting element and an electric current flowing through the reference element during a sensing period from supply of the reset signal to supply of the readout signal; and a second switching element that is provided between the accumulation node and the reference element, and that electrically separates the accumulation node and the reference element from each other when the potential of the accumulation node to which the readout signal is supplied is higher than a potential on a side of the reference element opposite to the accumulation node.

According to one aspect of the present invention, it is possible to provide an optical sensor having a wide dynamic range and reduced temperature dependence, and a display apparatus including such optical sensors.

Figure 1:
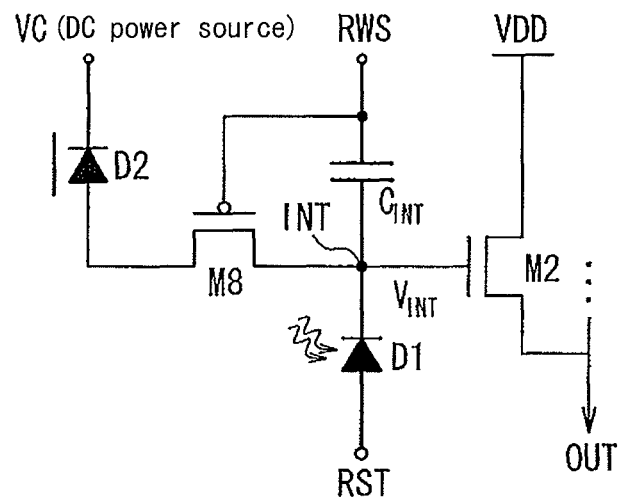
FIG. 1 is an equivalent circuit diagram of an optical sensor according to one embodiment of the present invention.

DETAILED DESCRIPTION OF THE INVENTION (1) An optical sensor according to one embodiment of the present invention includes: an accumulation node; a reset signal line for supplying a reset signal to the accumulation node; a readout signal line for supplying a readout signal to the accumulation node; a photodetecting element that is connected to the accumulation node and through which an electric current flows according to an amount of received incident light; a reference element that is connected to the photodetecting element via the accumulation node and that has a light-shielding layer with respect to incident light; a first switching element that outputs a potential of the accumulation node in response to the readout signal, the potential of the accumulation node varying with the electric current flowing through the photodetecting element and an electric current flowing through the reference element during a sensing period from supply of the reset signal to supply of the readout signal; and a second switching element that is provided between the accumulation node and the reference element, and that electrically separates the accumulation node and the reference element from each other when the potential of the accumulation node to which the readout signal is supplied is higher than a potential on a side of the reference element opposite to the accumulation node.

In this configuration, the potential of the accumulation node varies with output electric currents from the photodetecting element and the reference element. Besides, to the accumulation node, the first switching element is connected that reads out a potential of the accumulation node that varies with the output electric current during a sensing period (so-called integration period) from supply of the reset signal to supply of the readout signal. Thus, the potential of the accumulation node varies with a sum of a dark current output from the reference element ($I_{DARK}$, however, with a sign opposite to a sign of the dark current $I_{DARK}$ output from the photodetecting element) and a sum of a photoelectric current and a dark current ($I_{PHOTO}+I_{DARK}$). As a result, since only the component of the photoelectric current $I_{PHOTO}$ is reflected on the potential of the accumulation node, an intensity of incident light can be detected accurately, irrespective of the magnitude of the dark current $I_{DARK}$. Further, since the dark current $I_{DARK}$ does not affect the potential of the accumulation node, the dynamic range can be widened. Therefore, a display apparatus including an optical sensor capable of detecting the intensity of external light with high precision without being influenced by ambient temperature can be realized.

Further, during the readout period, the reference element is electrically separated from the accumulation node by the second switching element when the potential of the accumulation node exceeds a potential on a side of the reference element opposite to the accumulation node. Therefore, even if the potential of the accumulation node is high, the potential of the accumulation node, which varies during the sensing period, can be output accurately, irrespective of the potential on the side of the reference element. As a result, it is unnecessary to keep a potential of an electrode on the reference element side higher than that of the accumulation node, and therefore, the degree of freedom in circuit designing can be increased.

(2) In the above-described first configuration, preferably the second switching element is a p-channel thin-film transistor, and a control electrode of the second switching element is connected to the readout signal line (second configuration).

(3) In the above-described first configuration, preferably the second switching element is an n-channel thin-film transistor, and a control electrode of the second switching element is connected to a side of the reference element opposite to the accumulation node (third configuration).

(4) Any one of the above-described first to third configurations preferably further includes an accumulation capacitor having one of electrodes thereof connected to the accumulation node so as to charge/discharge output electric currents from the photodetecting element and the reference element (fourth configuration).

(5) Any one of the above-described first to third configurations may further include an amplifying element that amplifies the potential of the accumulation node in response to the readout signal (fifth configuration). According to this configuration, with the amplifying element that amplifies the potential of the accumulation node in response to the readout signal, a potential difference after the potential of the accumulation node is boosted up is greater than a potential difference of the accumulation node due to a difference in illuminance on the light receiving face at the end of the integration period. For example, a difference between a potential of the accumulation node in a dark state and a potential thereof when light at a saturation level is incident after the potential is boosted up during the readout period is greater than a difference between a potential of the accumulation node in a dark state and a potential thereof when light at a saturation level is incident at the end of the accumulation period. It should be noted that this potential difference amplification function is established, not only with respect to a difference between a potential in a dark state and a potential when light at a saturation level is incident, but also with respect to a difference between potential at arbitrary illuminances. Thus, it is possible to provide a display apparatus that includes optical sensors with high sensitivity.

(6) In the above-described fifth configuration, preferably, the amplifying element is a p-channel transistor provided between the accumulation node and the first switching element, and has a control electrode connected to the readout signal line (sixth configuration). In this case, the configuration is preferably such that in the p-channel thin-film transistor, a channel region is formed in a wide portion of a silicon film that connects the photodetecting element and the accumulation node with each other, and a gate electrode of the p-channel thin-film transistor is provided so as to overlap the wide portion. In this configuration, a length of a boundary between a p+ region formed by doping a p-type impurity and the channel region can be decreased, whereby a decrease in the dynamic range due to a parasitic capacitance, a leak current, etc. can be prevented.

(7) In the above-described fifth configuration, the amplifying element may be a variable capacitor having one of electrodes thereof connected to the accumulation node and the other electrode connected to the readout signal line (seventh configuration). In this case, for example, a MOS capacitor that includes the readout signal line, an insulation film, and a p-type semiconductor region formed in a silicon film can be used as the variable capacitor. Alternatively, a MOS capacitor that includes the gate electrode of the sensor switching element, an insulation film, and an n-type semiconductor region formed in a silicon film can be used as the variable capacitor. With the former configuration, the readout signal line can be used as a gate electrode of the variable capacitor. Therefore, the former configuration has an advantage that there is no need to provide a line or a contact for connecting the readout signal line and the gate electrode.

(8) In the above-described fifth configuration, the amplifying element is preferably an n-channel thin-film transistor (eighth configuration). Alternatively, (9) in the fifth configuration, the amplifying element may be a diode having a gate electrode on a channel (ninth configuration). With this configuration, a length of a boundary between an n+ region formed by doping an n-type impurity and the channel region can be decreased.

(10) In any one of the above-described first to ninth configurations, preferably, an output electric current of the photodetecting element and an output electric current of the reference element are equal to each other when no light is incident thereon (tenth configuration). More specifically, if a dark current of the photodetecting element and a dark current of the reference element are equal to each other, the temperature dependence of the optical sensor due to a change in ambient temperature can be eliminated substantially completely.

(11) In any one of the above-described first to tenth configurations, it is preferable that the photodetecting element and the reference element are photodiodes, and a length and a width of an interval region between a p-layer and an n-layer of one of the photodiodes are equal to a length and a width of that of the other photodiode, respectively (eleventh configuration). It should be noted that cases implied by "equal" includes a case where even when the lengths and widths are equal to each other, respectively, in design, the lengths and widths actually obtained are not strictly identical to designed ones due to variability in processes such as etching and exposure. With the above-described configuration, though there is a possibility that a slight difference could occur due to self-parasitic accumulation capacitance, etc., the photodetecting element and the reference element have substantially identical characteristics. As a result, a dark current of the photodetecting element and that of the reference element are equal to each other, and therefore, the temperature dependence of the optical sensor, i.e., dependence on a change in ambient temperature can be eliminated substantially completely.

(12) In any one of the above-described fourth to eleventh configurations, it is preferable that the first switching element is formed with one transistor, and the readout signal line is connected to the other electrode of the accumulation capacitor (twelfth configuration).

(13) Any one of the above-described fourth to eleventh configurations can be further modified so that the first switching element is formed with a first transistor and a second transistor; a control electrode of the first transistor is connected to the accumulation node; one of two electrodes other than the control electrode of the first transistor is connected to a line for supplying a constant voltage; the other one of the two electrodes other than the control electrode of the first transistor is connected to one of two electrodes other than a control electrode of the second transistor; the control electrode of the second transistor is connected to the readout signal line; the other electrode of the accumulation capacitor is connected to a line for supplying a constant voltage; and the other one of the two electrodes other than the control electrode of the second transistor is connected to a readout line for reading out the output electric current (thirteenth configuration).

(14) Any one of the above-described fourth to eleventh configurations may be further modified so that the first switching element is formed with a first transistor, a second transistor, and a third transistor; a control electrode of the first transistor is connected to the accumulation node; one of two electrodes other than the control electrode of the first transistor is connected to a line for supplying a constant voltage; the other one of the two electrodes other than the control electrode of the first transistor is connected to one of two electrodes other than a control electrode of the second transistor; the other electrode of the accumulation capacitor is connected to a constant voltage line; the control electrode of the second transistor is connected to the readout signal line; the other one of the two electrodes other than the control electrode of the second transistor is connected to a readout line for reading out an output electric current a control electrode of the third transistor is connected to the reset signal line; one of two electrodes other than the control electrode of the third transistor is connected to the accumulation node; and the other one of the two electrodes other than the control electrode of the third transistor is connected to a line for supplying a constant voltage (fourteenth configuration).

(15) A display device according to the present invention is a display device that includes the optical sensor according to any one of the above-described first through fourteenth configurations in a pixel region of an active matrix substrate (fifteenth configuration).

Hereinafter, more specific embodiments of the present invention are explained with reference to the drawings. It should be noted that the following embodiments show exemplary configurations in the case where a display apparatus according to the present invention is embodied as a liquid crystal display device, but the display apparatus according to the present invention is not limited to a liquid crystal display device, and is applicable to an arbitrary display apparatus in which an active matrix substrate is used. It should be noted that a display apparatus according to the present invention, as having optical sensors, is assumed to be used as a touch-panel-equipped display device that detects an object approaching its screen and carries out an input operation, a display apparatus for two-way communication having a display function and an image pickup function, etc.

Further, the drawings referred to hereinafter show, in a simplified manner, only principal members needed for explanation of the present invention among constitutional members of embodiments of the present invention, for convenience of explanation. Therefore, a display apparatus according to the present invention may include arbitrary members that are not shown in the drawings that the present specification refers to. Further, the dimensions of the members shown in the drawings do not faithfully reflect actual dimensions of constitutional members, dimensional ratios of the members, etc.

FIG. 1 shows a circuit configuration of an optical sensor according to First Embodiment. An optical sensor shown in FIG. 1 includes photodiodes D1 and D2, a capacitor $C_{INT}$ (accumulation capacitor), a thin-film transistor M2 (first switching element), and a p-channel thin-film transistor M8 (second switching element). The photodiode D1 is an exemplary photodetecting element through which an electric current flows according to an amount of received incident light, and the photodiode D2 is an exemplary reference element having a light-shielding layer for shielding incident light.

The photodiodes D1 and D2 have circuit characteristics or element characteristics that are optimized so that output electric currents when no light is projected thereto are equal. Since I-V characteristics (reverse-bias region) of photodiodes do not depend on an applied voltage, ideally, dark currents of the photodiodes D1 and D2 are equal to each other in the case where the sizes (a length L and a width W of a semiconductor layer that functions as a photodetecting region) of the photodiodes D1 and D2 are equal. It should be noted that a PN-junction diode or a PIN junction diode having a lateral structure or a laminate structure, for example, can be used as the photodiode D1 or D2. In this case, as described above, it is preferable that two photodiodes are used as the photodiodes D1 and D2, wherein a length and a width of a boundary region between a p-layer and an n-layer (that is, a semiconductor layer functioning as a photodetecting region) of one of them are equal to a length and a width of a boundary region of the other, respectively. With this preferable configuration, it is possible to substantially equalize output electric currents of the photodiodes D1 and D2 when they are not irradiated with light, though there could be minute difference due to their own parasite capacitance. It should be noted that the photodiode D1 receives incident light, whereas the photodiode D2 used as a reference element for detecting a dark current is shielded so that no external light is incident thereon.

To an anode of the photodiode D1, a line RST (reset signal line) for supplying a reset signal is connected. A cathode of the photodiode D1 is connected to an accumulation node INT. To the accumulation node INT, one of electrodes of the capacitor $C_{INT}$ is connected. The other electrode of the capacitor $C_{INT}$ is connected with a line RWS. The line RWS is an exemplary readout signal line for supplying a readout signal to the accumulation node INT.

A cathode of the photodiode D2 is connected with a reference voltage line VC (DC power source) for supplying a signal having a constant voltage $V_C$. An anode of the photodiode D2 is connected to the accumulation node INT via a p-channel thin-film transistor M8. In other words, a source, a drain, and a gate (an exemplary control electrode) of the p-channel thin-film transistor M8 are connected to an anode of the photodiode D2, the accumulation node INT, and the line RWS, respectively.

To the accumulation node INT, a gate (control electrode) of a transistor M2 is connected. A drain of the transistor M2 is connected to a line VDD for supplying a constant voltage $V_{DD}$ to the optical sensor, and a source of the transistor M2 is connected to a line OUT for outputting, respectively.

In the circuit configuration shown in FIG. 1, electric currents flowing through the photodiodes D1 and D2 are charged in the capacitor $C_{INT}$ or discharged from the capacitor $C_{INT}$. Therefore, a potential of the accumulation node INT varies with an electric current flowing through the photodiodes D1 and D2. For example, during a sensing period from when a reset signal is supplied from the line RST to when a readout signal is supplied from the line RWS, the potential of the accumulation node INT varies with electric currents flowing depending on an amount of light received by the photodiode D1 and an electric current flowing through the photodiode D2. When the readout signal is supplied, the transistor M2 becomes conductive, thereby allowing a signal corresponding to a potential of the accumulation node INT to be output to the line OUT.

Further, the p-channel thin-film transistor V8 becomes non-conductive when, upon supply of the readout signal, the readout signal $V_{RWS}$ is higher than a value obtained by adding a value of a potential $V_{INT}$ of the accumulation node INT and a threshold value Vth of the p-channel thin-film transistor M8. In other words, when the readout signal $V_{RWS}$ is higher than a value obtained by adding the value of the potential $V_{INT}$ of the accumulation node INT and the threshold value Vth of the p-channel thin-film transistor M8, the accumulation node INT and the photodiode D2 are separated electrically. As a result, the potential of the accumulation node INT can be boosted up to or over the voltage $V_C$ by the readout signal.

Figure 2:
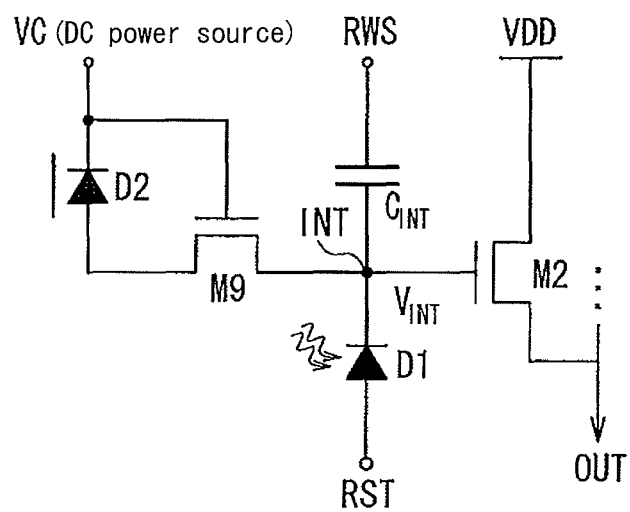
FIG. 2 is an equivalent circuit diagram of an optical sensor according to one embodiment of the present invention.

FIG. 2 shows an exemplary modification of the circuit configuration of the optical sensor according to the present embodiment. In the example shown in FIG. 2, an n-channel thin-film transistor M9 is provided between the photodiode D2 and the accumulation node INT. In other words, a drain, a source, and a gate (control electrode) of the n-channel thin-film transistor M9 are connected to the anode of the photodiode D2, the accumulation node INT, and the reference voltage line VC, respectively.

In the circuit configuration shown in FIG. 2 as well, the n-channel thin-film transistor M9 becomes non-conductive when the potential $V_{INT}$ of the accumulation node INT is higher than a value obtained by subtracting the threshold value Vth of the n-channel thin-film transistor M9 from the voltage $V_C$. In other words, when the potential $V_{INT}$ of the accumulation node is higher than a value obtained by subtracting the threshold value Vth of the n-channel thin-film transistor M9 from the value of voltage $V_C$, the accumulation node INT and the photodiode D2 are separated electrically. As a result, the potential of the accumulation node INT can be boosted up to or over the voltage $V_C$ by the readout signal.

Figure 7:
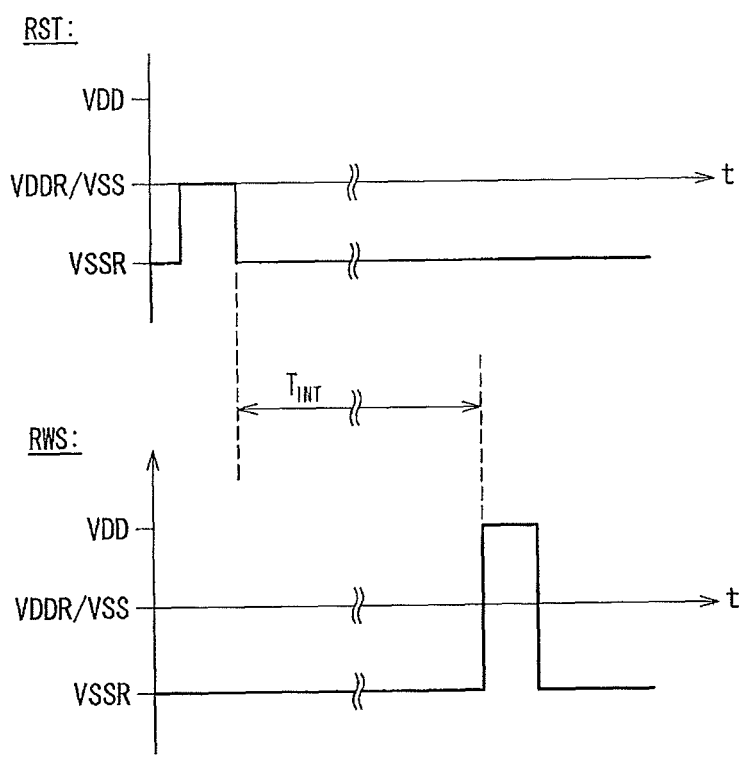
FIG. 7 is a timing chart showing respective waveforms of a reset signal supplied from a line RST to an optical sensor and a readout signal supplied from a line RWS to the optical sensor in a display apparatus according to one embodiment of the present invention.
Figure 8:
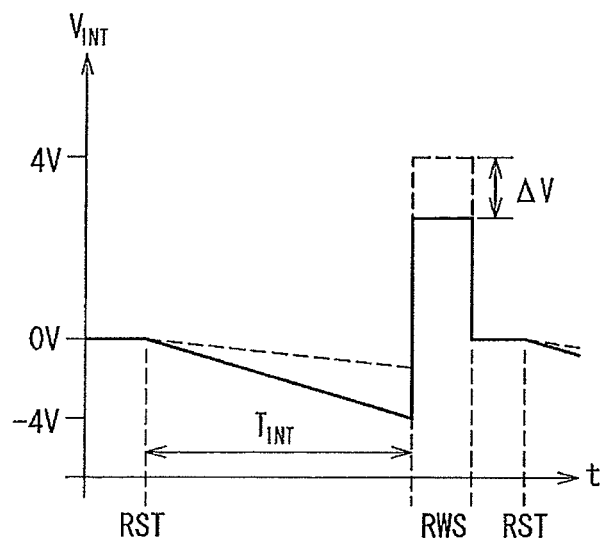
FIG. 8 is a waveform diagram showing a relationship between input signals (RST, RWS) and $V_{INT}$ in an optical sensor according to one embodiment of the present invention.

Here, with reference to FIGS. 7 and 8, an action of the optical sensor according to the present embodiment is explained. FIG. 7 is a timing chart showing a waveform of the reset signal supplied from the line RST to the optical sensor, and a waveform of the readout signal supplied from the line RWS to the optical sensor. FIG. 8 is a waveform diagram showing a relationship between the input signals (RST, RWS) and $V_{INT}$ in the optical sensor according to First Embodiment.

In the example shown in FIGS. 7 and 8, the reset signal has a high level $V_{RST.H}$ of 0 V, and a low level $V_{RST.L}$ of −4 V. In this example, the high level $V_{RST.H}$ of the reset signal is equal to $V_{SS}$. Further, the readout signal has a high level $V_{RWS.H}$ of 4 V, and a low level $V_{RWS.L}$ of −4 V. In this example, the high level $V_{RWS.H}$ of the readout signal is equal to $V_{DD}$, and the low level $V_{RWS.L}$ is equal to $V_{SSR}$.

First, when the reset signal supplied from the sensor low driver 5 to the line RST rises from a low level (−4 V) to a high level (0 V), a forward bias is applied to the photodiode D1. Here, since the potential $V_{INT}$ of the gate electrode of the transistor M2 is lower than the threshold voltage of the transistor M2, the transistor M2 is non-conductive. Further, the potential of the gate electrode of the p-channel thin-film transistor M8 is equal to the low level (−4 V) of the readout signal, the p-channel thin-film transistor M8 is conductive. Therefore, the photodiode D2 is also reset with the reset signal.

Next, the reset signal returns to the low level $V_{RST.L}$, and thereby a photoelectric current integration period (period $T_{INT}$ shown in FIG. 8) starts. During the integration period, a reverse bias is applied to the photodiodes D1 and D2, whereby an electric current flows out of the capacitor $C_{INT}$; thus, the capacitor $C_{INT}$ is discharged. Here, the photodiode D1 allows a sum of a photoelectric current $I_{PHOTO}$ generated by incident light and a dark current $I_{DARK}$ to flow out of the accumulation node INT. On the other hand, the photodiode D2 allows a dark current $I_{DARK}$ to flow out of the accumulation node INT via the p-channel thin-film transistor M8. As a result, an electric current flowing out of the capacitor $C_{INT}$ to the accumulation node INT is substantially only an electric current corresponding to the photoelectric current $I_{PHOTO}$. During the integration period also, since $V_{INT}$ is lower than the threshold voltage of the transistor M2, the transistor M2 is non-conductive.

When the integration period ends, as shown in FIG. 7, the readout signal RWS rises, whereby a readout period starts. It should be noted that the readout period continues while the readout signal RWS is at a high level. During the readout period, the potential of the gate of the p-channel thin-film transistor M8 is equal to the readout signal $V_{RWS}$. Therefore, the potential of the gate of the p-channel thin-film transistor M8 becomes higher than the threshold voltage, and thereby the p-channel thin-film transistor M8 becomes non-conductive. Therefore, supply of the readout signal RWS does not cause a forward bias to be applied to the photodiode D2.

Further, injection of electric charges to the capacitor $C_{INT}$ occurs. As a result, the potential $V_{INT}$ of the gate electrode of the transistor M2 becomes higher than the threshold voltage of the transistor M2. This causes the transistor M2 to become conductive. For example, by providing a bias transistor M3 (not shown) at an end of the line OUT, the transistors M2 and M3 are caused to function as source follower amplifiers. In other words, a signal voltage output from the drain of the transistor M3 via the output line SOUT is equivalent to a value of an integral of the photoelectric current $I_{PHOTO}$ by light incident on the photodiode D1 during an integration period.

In FIG. 8, the waveform indicated by the broken line represents variation of the potential $V_{INT}$ in the case where light incident on the photodiode D1 is small in amount. On the other hand, in FIG. 8, the waveform indicated by the solid line represents variation of the potential $V_{INT}$ in the case where external light is incident on the photodiode D1. ΔV in FIG. 8 is a potential difference proportional to an integral of the photoelectric current $I_{PHOTO}$ from the photodiode D1.

The optical sensor according to the present embodiment charges/discharges only the charges corresponding to the photoelectric current $I_{PHOTO}$ of the photodiode D1 to/from the capacitor $C_{INT}$, as described above. Therefore, irrespective of the magnitude of the dark current $I_{DARK}$, the intensity of the external light can be detected accurately. Further, since the dark current $I_{DARK}$ is not discharged from the capacitor $C_{INT}$, the dynamic range can be widened. This makes it possible to realize an optical sensor that is capable of detecting an intensity of external light with high precision, without being influenced by ambient temperature.

Further, the voltage $V_C$ of the reference voltage line VC may be at any level as long as it is higher than the high level $V_{RST.H}$ of the reset signal. Therefore, a DC power source can be used for the reference voltage line VC.

Still further, since upon supply of the readout signal from the line RWS, the p-channel thin-film transistor M8 becomes non-conductive thereby making the photodiode D2 ineffective, it is unnecessary to maintain a state in which a reverse bias is applied to the photodiode D2 during the readout period. Therefore, it is unnecessary to set high the voltage of the reference voltage line VC, to which the cathode of the photodiode D2 is connected.

Figure 3:
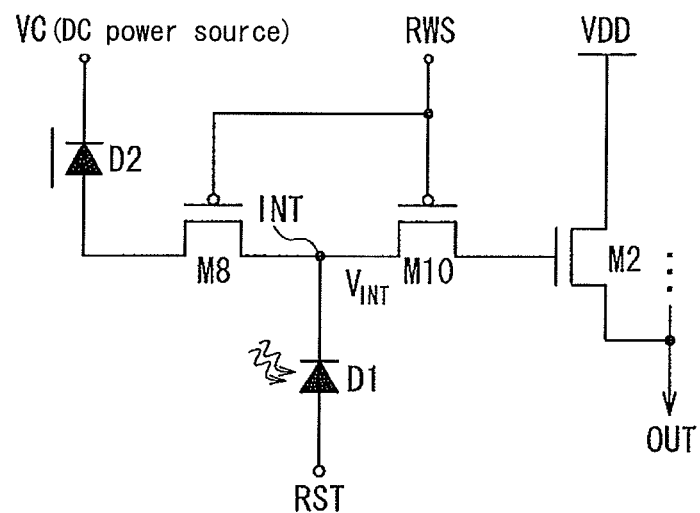
FIG. 3 is an equivalent circuit diagram of an optical sensor according to one embodiment of the present invention.

Thus, the degree of freedom in designing the voltage of the readout signal is increased, and this makes it possible to provide, for example, a configuration in which an amplifying element is connected to the line RWS for supplying the readout signal. FIG. 3 shows an exemplary circuit configuration in the case where an amplifying element is used in place of the capacitor $C_{INT}$ in the optical sensor shown in FIG. 1.

The optical sensor shown in FIG. 3 includes a p-channel thin-film transistor M10 as an exemplary amplifying element. A drain, a source, and a gate of the p-channel thin-film transistor M10 are connected to the accumulation node INT, the gate of the transistor M2, and the line RWS for supplying the readout signal, respectively.

Figure 4:
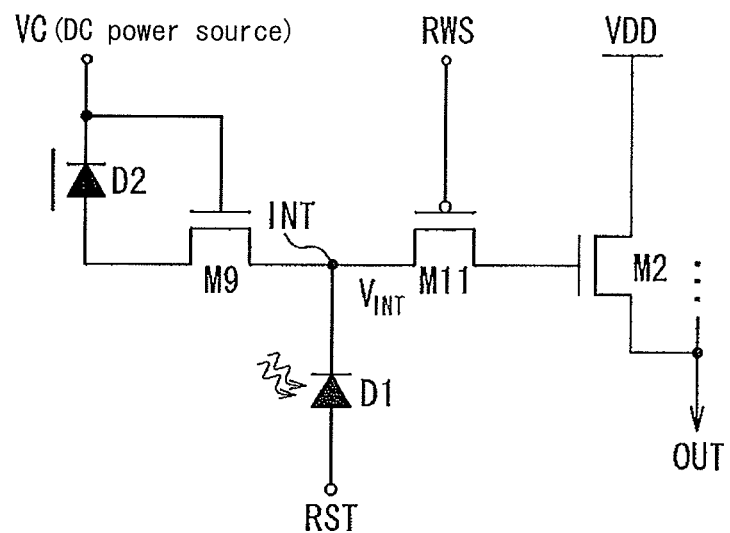
FIG. 4 is an equivalent circuit diagram of an optical sensor according to one embodiment of the present invention.

An optical sensor shown in FIG. 4 shows an exemplary circuit configuration in the case where a p-channel thin-film transistor M11 is used in place of the capacitor $C_{INT}$ in the optical sensor shown in FIG. 2. A drain, a source, and a gate of the p-channel thin-film transistor M11 are connected to the accumulation node INT, the gate of the transistor M2, and the line RWS for supplying the readout signal, respectively.

The amplifying element shown in FIGS. 3 and 4 (p-channel thin-film transistor M10, M11) is an exemplary amplifying element for amplifying a potential of the accumulation node INT. Examples that can be used as the amplifying element include the following, except for the p-channel thin-film transistor: a variable capacitor (details will be described later); an n-channel thin-film transistor; and a diode having a gate electrode on a channel.

With the p-channel thin-film transistor M10 or M11, the potential of the accumulation node INT can be amplified and read out. An operating condition of an amplifying element such as the p-channel thin-film transistor M10 or M11 is that the low level $V_{RWS,L}$ of the readout signal does not exceed a value obtained by adding a value of the potential $V_{INT}$ of the accumulation node and a threshold value Vth of the p-channel thin-film transistor M10 or M11. During the sensing period (period from when the reset signal is supplied to when the readout signal is supplied), the p-channel thin-film transistor M10 or M11 is conductive, and this conductive state shifts to a non-conductive state during the readout period (details of this action will be described later). Since the readout signal can be set freely irrespective of the reference voltage VC, a configuration in which an amplifying element is used is feasible, as shown in FIGS. 3 and 4.

Figure 5:
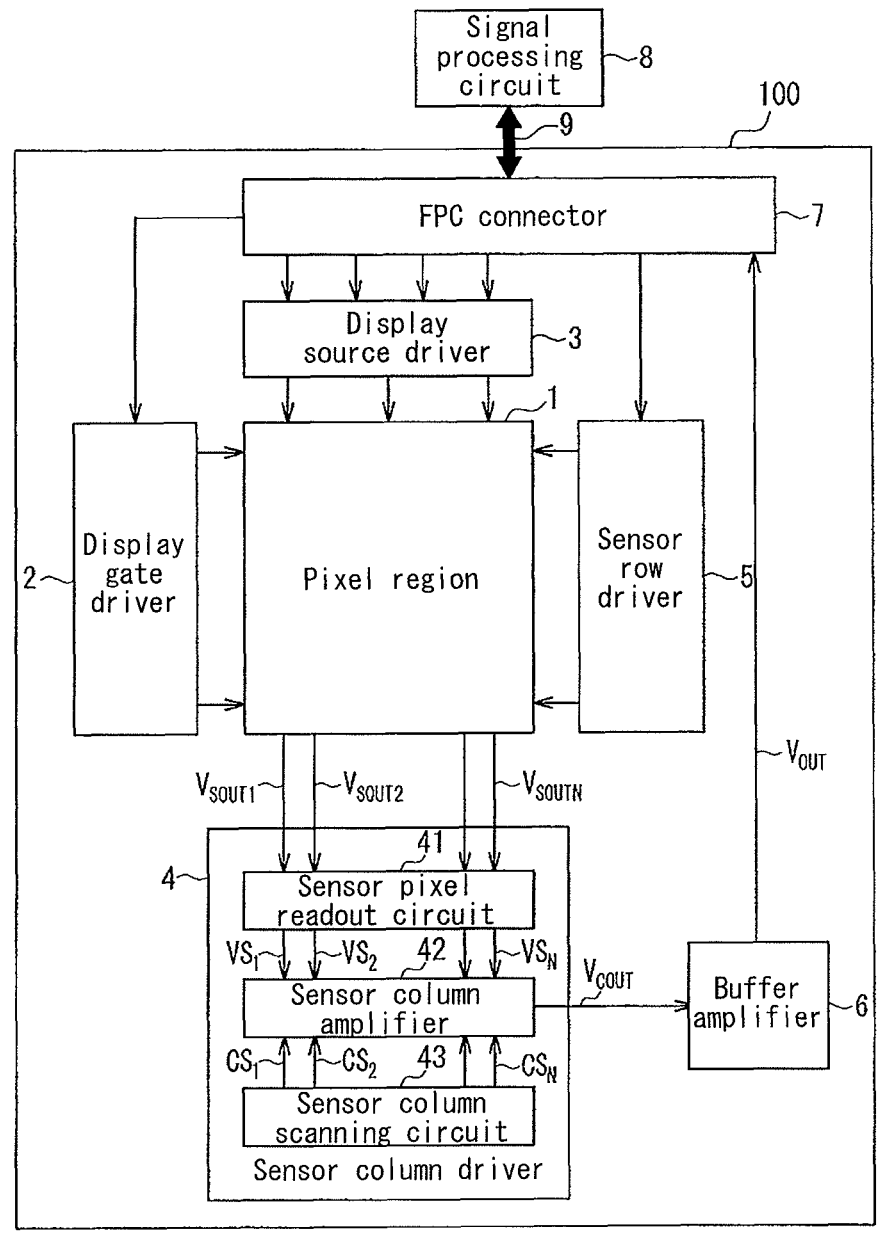
FIG. 5 is a block diagram showing a schematic configuration of a display apparatus according to one embodiment of the present invention.
Figure 6:
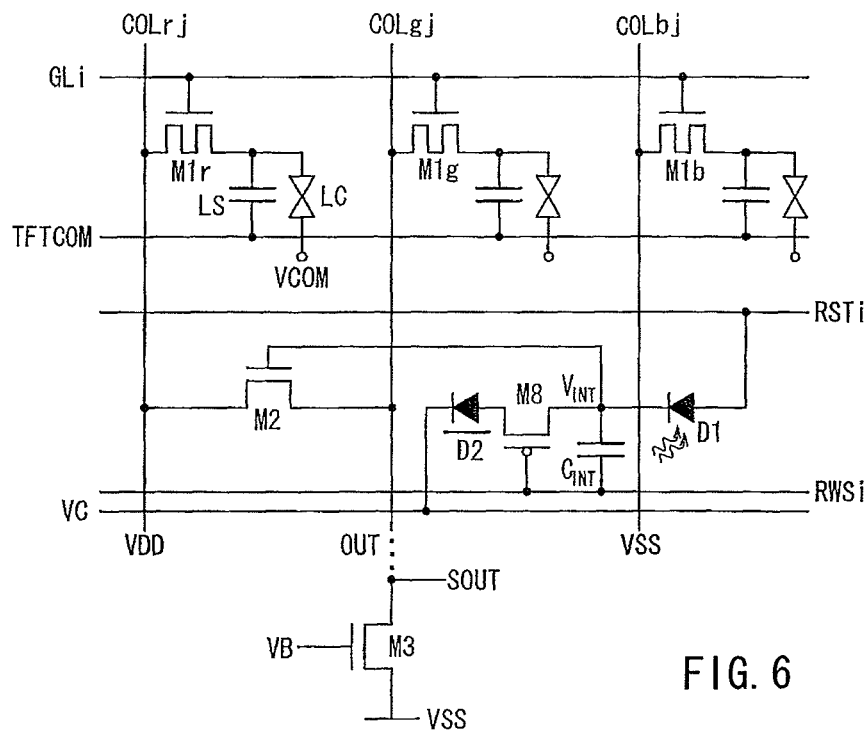
FIG. 6 is an equivalent circuit diagram showing a configuration of one pixel in a display apparatus according to one embodiment of the present invention.

First, a configuration of a liquid crystal display device that includes an optical sensor according to Second Embodiment of the present invention is explained, with reference to FIGS. 5 and 6.

FIG. 5 is a block diagram showing a schematic configuration of an active matrix substrate 100 provided in a liquid crystal display device according to one embodiment of the present invention. As shown in FIG. 5, the active matrix substrate 100 includes, on its glass substrate, at least a pixel region 1, a display gate driver 2, a display source driver 3, a sensor column driver 4, a sensor row driver 5, a buffer amplifier 6, and an FPC connector 7. Further, a signal processing circuit 8 for processing an image signal captured by a photodetecting element (to be described later) in the pixel region 1 is connected with the active matrix substrate 100 via the FPC connector 7 and a FPC 9.

It should be noted that the above-described members on the active matrix substrate 100 may be formed monolithically on the glass substrate through semiconductor processing. Alternatively, the configuration may be as follows: the amplifiers and drivers among the above-described members may be mounted on the glass substrate by, for example, COG (chip on glass) techniques. Further alternatively, at least a part of the aforementioned members shown on the active matrix substrate 100 in FIG. 5 could be mounted on the FPC 9. The active matrix substrate 100 is laminated with a counter substrate (not shown) having a counter electrode formed over an entire surface thereof. A liquid crystal material is sealed in the space between the active matrix substrate 100 and the counter substrate.

The pixel region 1 is a region where a plurality of pixels are formed for displaying images. In the present embodiment, an optical sensor for capturing images is provided in each pixel in the pixel region 1. FIG. 6 is an equivalent circuit diagram showing an arrangement of the pixels and the optical sensors in the pixel region 1 in the active matrix substrate 100. In the example shown in FIG. 6, one pixel is composed of three primary color dots of R (red), G (green), and B (blue). In one pixel composed of these three color dots, there is provided one optical sensor composed of two photodiodes D1 and D2, a capacitor $C_{INT}$, a thin-film, transistor M2, and a p-channel thin-film transistor M8. The pixel region 1 includes the pixels arrayed in a matrix of M rows×N columns, and the optical sensors arrayed likewise in a matrix of M rows×N columns. It should be noted that, as described above, the number of the color dots is M×3N.

Therefore, as shown in FIG. 6, the pixel region 1 has gate lines GL and source lines COL arrayed in matrix as lines for pixels. The gate lines GL are connected with the display gate driver 2. The source lines COL are connected with the display source driver 3. It should be noted that M rows of the gate lines GL are provided in the pixel region 1. Hereinafter, when an individual gate line GL needs to be described distinctly, it is denoted by GLi (i=1 to M). On the other hand, three source lines COL are provided per one pixel so as to supply image data to three color dots in the pixel, as described above. When an individual source line COL needs to be described distinctly, it is denoted by COLrj, COLgj, or COLbj (j=1 to N).

At each of intersections of the gate lines GL and the source lines COL, a thin-film transistor (TFT) M1 is provided as a switching element for a pixel. It should be noted that in FIG. 6, the thin film transistors M1 provided for color dots of red, green, and blue are denoted by M1r, M1g, and M1b, respectively. A gate electrode of the thin film transistor M1 is connected to the gate line GL, a source electrode thereof is connected to the source line COL, and a drain electrode thereof is connected to a pixel electrode, which is not shown. Thus, a liquid crystal capacitor LC is formed between the drain electrode of the thin film transistor M1 and the counter electrode (VCOM), as shown in FIG. 6. Further, an auxiliary capacitor LS is formed between the drain electrode and a TFT COM.

In FIG. 6, for a color dot driven by a thin-film transistor M1r connected to one gate line GLi and one source line COLrj, a red color filter is provided so as to correspond to this color dot. This color dot is supplied with image data of red color from the display source driver 3 via the source COLrj, thereby functioning as a red color dot.

Further, for a color dot driven by a thin-film transistor M1g connected to the gate line GLi and the source line COLgj, a green color filter is provided so as to correspond to this color dot. This color dot is supplied with image data of green color from the display source driver 3 via the source line COLgj, thereby functioning as a green color dot.

Still further, for a color dot driven by a thin-film transistor M1b connected to the gate line GLi and the source line COLbj, a blue color filter is provided so as to correspond to this color dot. This color dot is supplied with image data of blue color from the display source driver 3 via the source line COLbj, thereby functioning as a blue color dot.

It should be noted that in the example shown in FIG. 6, optical sensors are provided so that one optical sensor corresponds to one pixel (three color dots) in the pixel region 1. The ratio between the pixels and the optical sensors provided, however, is not limited to this example, but is arbitrary. For example, one optical sensor may be provided per one color dot, or one optical sensor may be provided per a plurality of pixels.

The optical sensor includes, as shown in FIG. 6, photodiodes D1 and D2, a capacitor $C_{INT}$, a thin-film transistor M2, and a p-channel thin-film transistor M8. The optical sensor shown in FIG. 6 has the same circuit configuration as that shown in FIG. 1.

In the example of FIG. 6, the source line COLr also functions as a line VDD for supplying a constant voltage $V_{DD}$ from the sensor column driver 4 to the optical sensor. Besides, the source line COLg also functions as a line OUT for sensor output.

To an anode of the photodiode D1, a line RST for supplying a reset signal is connected. The photodiode D1 and the p-channel thin-film transistor M8 are connected in series. A gate of the transistor M2 and one of electrodes of the capacitor $C_{INT}$ are connected to between a cathode of the photodiode D1 and a drain of the p-channel thin-film transistor M8. A source of the p-channel thin-film transistor M8 is connected to an anode of the photodiode D2. A gate of the p-channel thin-film transistor M8 is connected to a line RWS. A cathode of the photodiode D2 is connected to a reference voltage line VC.

A drain of the transistor M2 is connected to a line VDD, and a source of the same is connected to a line OUT. Lines RST and RWS are connected to a sensor row driver 5. These lines RST and RWS are provided per each row. Therefore, hereinafter, when the lines should be distinguished, they are denoted by RSTi and RWSi (i=1 to M).

The sensor row driver 5 selects the lines RSTi and RWSi in combination shown in FIG. 6 sequentially at predetermined time intervals ($t_{row}$). With this, the rows of the optical sensors from which signal charges are to be read out are selected sequentially in the pixel region 1.

It should be noted that, as shown in FIG. 6, a drain of the insulated gate field effect transistor M3 is connected to an end of a line OUT. To this drain of the transistor M3, an output line SOUT is connected, so that a potential $V_{SOUT}$ of the drain of the transistor M3 is output to the sensor column driver 4, as an output signal from the optical sensor. The source of the transistor M3 is connected to a line VSS. A gate of the transistor M3 is connected to a reference voltage power source (not shown) via the reference voltage line VB.

An action of the optical sensor according to the present embodiment is identical to the action shown in FIGS. 7 and 8.

An optical sensor output of each pixel can be obtained by, like the action shown in FIGS. 7 and 8, cyclically performing initialization with a reset pulse, integration of a photoelectric current during the integration period, and readout of a sensor output during the readout period.

The optical sensor provided at each pixel in the display apparatus according to the present embodiment charges/discharges only an electric current corresponding to the photoelectric current $I_{PHOTO}$ of the photodiode D1 to/from the capacitor $C_{INT}$, as described above. As a result, it is possible to detect an intensity of external light accurately, irrespective of the magnitude of the dark current $I_{DARK}$. Further, since the dark current $I_{DARK}$ is not discharged from the capacitor $C_{INT}$, it is possible to set a wider dynamic range. This makes it possible to realize an optical sensor that is capable of detecting an intensity of external light with high precision, without being influenced by ambient temperature.

Further, since the voltage of the reference voltage line VC may be at any level as long as it is higher than the high level $V_{RST\_H}$ of the reset signal, a DC power source can be used for the reference voltage line VC.

Still further, since upon supply of a readout signal RWS, the p-channel thin-film transistor M8 becomes non-conductive thereby making the photodiode D2 ineffective, it is unnecessary to maintain a state in which a reverse bias is applied to the photodiode D2 during the readout period. Therefore, it is unnecessary to set high the voltage of the reference voltage line VC, to which the cathode of the photodiode D2 is connected.

Figure 20:
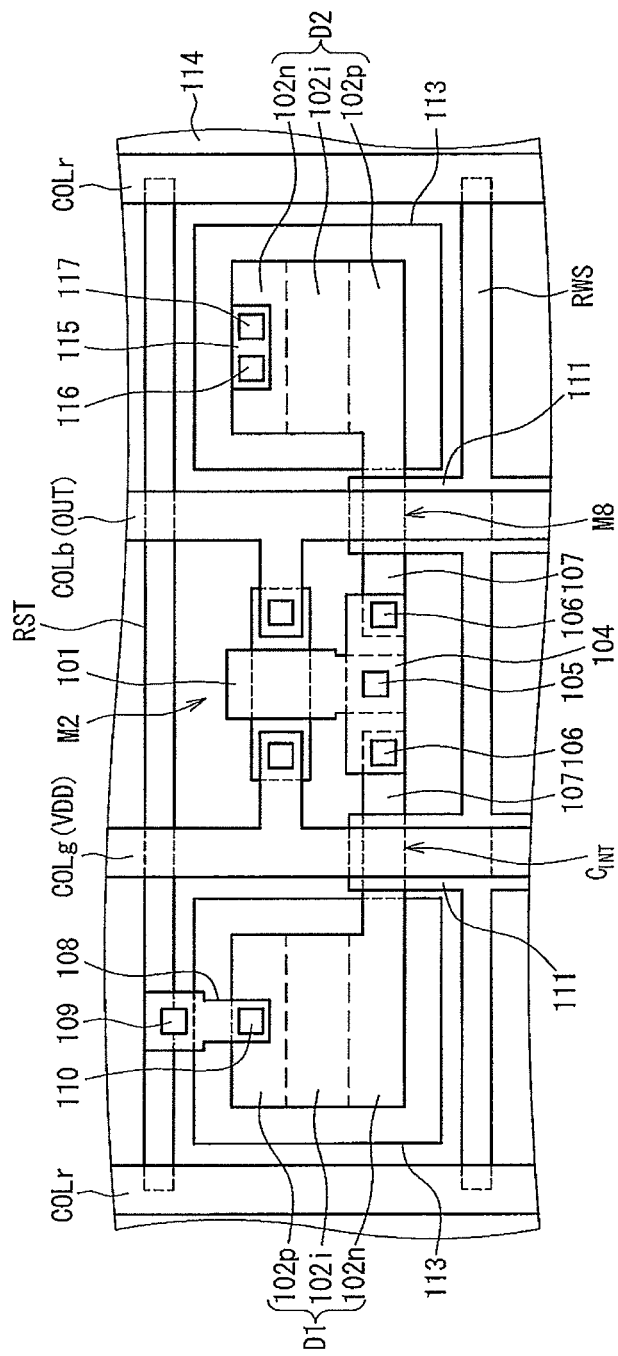
FIG. 20 is a plan view showing an exemplary planar structure of an optical sensor according to one embodiment of the present invention.

Alternatively, a circuit may be formed with use of already existing line, instead of the reference voltage line VC. For example, a shield electrode formed with a transparent electrode ITO formed on a photodiode for characteristic stabilization may be used for forming the circuit. FIG. 20 is a plan view showing an exemplary planar structure of an optical sensor according to the present embodiment.

As shown in FIG. 20, an optical sensor according to the present embodiment includes a transistor M2 in a region between a source line COLg and a source line COLb. A photodiode D1 is a PIN diode having a lateral structure in which a p-type semiconductor region 102p, an i-type semiconductor region 102i, and an n-type semiconductor region 102n are formed in series on a silicon film as a base. The p-type semiconductor region 102p functions as an anode of the photodiode D1, and is connected to a line RST via a line 108 and contacts 109 and 110. The n-type semiconductor region 102n functions as a cathode of the photodiode D1, and is connected to a gate electrode 101 of a transistor M2 via an extended portion 107 of the silicon film, contacts 105 and 106, and a line 104.

The photodiode D2 is, like the photodiode D1, a PIN diode having a lateral structure, in which a p-type semiconductor region 102p, an i-type semiconductor region 102i, and an n-type semiconductor region 102n are formed in series on a silicon film as a base. It should be noted that the n-type semiconductor region 102n (cathode) is connected to a shield electrode 114 via a line 115 and contacts 116 and 117; and that the p-type semiconductor region 102p (anode) is connected to a gate electrode 101 of the transistor M2 via an extended portion 107 of the silicon film, contacts 105 and 106, and a line 104.

In this configuration, lines RST and RWS are formed with the same metal through the same process as those for the gate electrode 101 of the transistor M2. Besides, the lines 104 and 108 are formed with the same metal through the same process as those for the source line COL. On the backside of the photodiodes D1 and D2, shield films 113 for preventing backlight from being incident on the sensor are provided.

Figure 17:
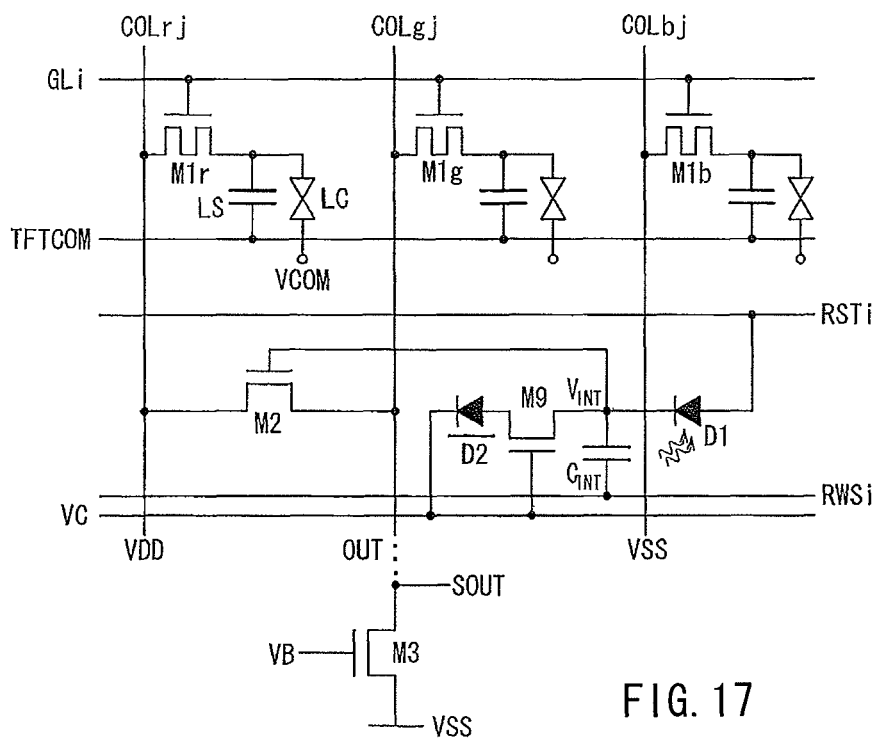
FIG. 17 is an equivalent circuit diagram showing one exemplary modification of a display apparatus according to one embodiment of the present invention.

It should be noted that the optical sensor having the p-channel thin-film transistor M8 is disclosed as the present embodiment, but the present embodiment may have a configuration in which an n-channel thin-film transistor M9 is provided in place of the p-channel thin-film transistor M8, as shown in FIG. 17. In FIG. 17, the gate of the n-channel thin-film transistor M9 is connected to, not the line RWS, but the reference voltage line VC, like the cathode of the photodiode D2. It should be noted that the voltage of the reference voltage line VC may be at any level as long as it is higher than the high level $V_{RST\_H}$ of the reset signal and lower than a high level $V_{RWS\_H}$ of the readout signal.

When the readout signal RWS rises, the potential of $V_{INT}$ is boosted up. Immediately after this, when the potential of $V_{INT}$ thus boosted up exceeds a value obtained by subtracting the threshold value Vth of the n-channel thin-film transistor M9 from VC, an OFF voltage is applied to the n-channel thin-film transistor M9. In other words, when the OFF voltage is applied, the n-channel thin-film transistor M9 becomes non-conductive. Thus, $V_{INT}$ can be boosted to over VC, by the readout signal RWS.

With this configuration also, only an electric current corresponding to the photoelectric current $I_{PHOTO}$ of the photodiode D1 is charged/discharged to/from the capacitor $C_{INT}$. Therefore, irrespective of the magnitude of the dark current $I_{DARK}$ the intensity of the external light can be detected accurately. Further, since the dark current $I_{DARK}$ is not discharged from the capacitor $C_{INT}$, the dynamic range can be widened. This makes it possible to realize an optical sensor that is capable of detecting an intensity of external light with high precision, without being influenced by ambient temperature.

It should be noted that the configuration shown in FIG. 17 has the following advantages as compared with the configuration shown in FIG. 6. In the case of the configuration shown in FIG. 17, the degree of freedom in setting the voltage of the readout signal RWS ($V_{RWS\_H}$ or $V_{RWS\_L}$) is high. In contrast, in the case of the configuration shown in FIG. 6, it is necessary to set the low level $V_{RWS\_L}$ of the readout signal RWS lower than the high level $V_{RST\_H}$ of the reset signal.

Figure 21:
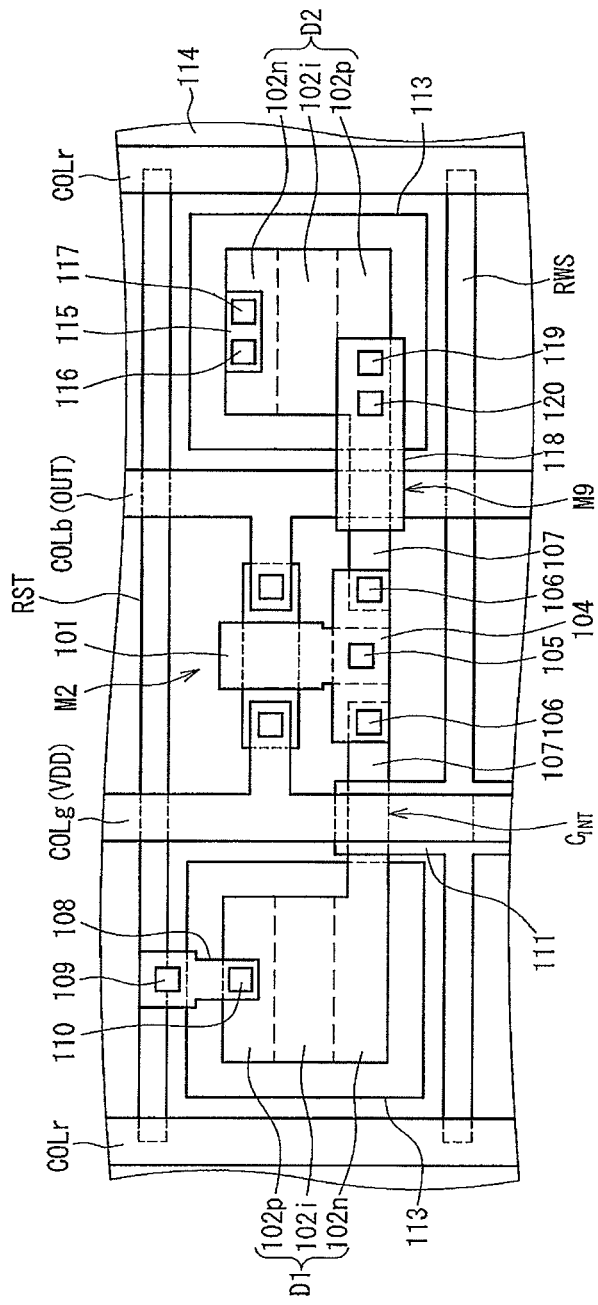
FIG. 21 is a plan view showing an exemplary planar structure of an optical sensor according to one embodiment of the present invention.

FIG. 21 is a plan view showing an exemplary planar structure of the optical sensor shown in FIG. 17. It should be noted that in the explanation of FIG. 21 below, members having the same functions as those in the configuration explained above with reference to FIG. 20 are denoted by the same reference numerals, and detail explanations of the same are omitted. As shown in FIG. 21, the gate electrode of the n-channel thin-film transistor M9 is connected to a shield electrode 114 via contacts 119 and 120 and a line 118.

Figure 9:
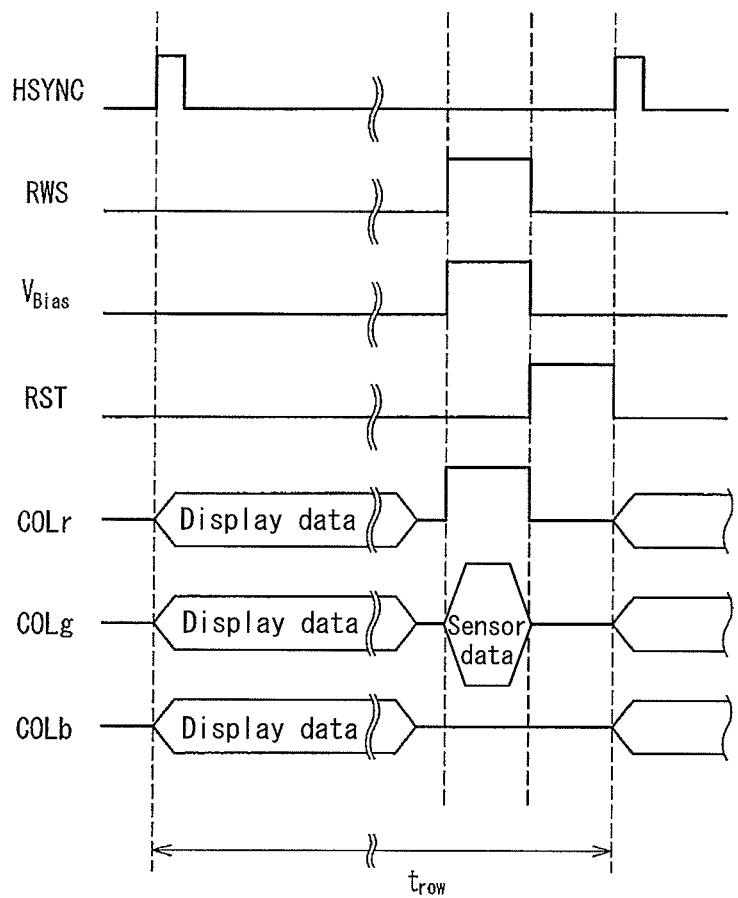
FIG. 9 is a timing chart showing a sensor driving timing in a display apparatus according to one embodiment of the present invention.

It should be noted that in the present embodiment, source lines COLr, COLg, and COLb are used as the lines VDD, OUT, and VSS for the optical sensor, as described above. Therefore, as shown in FIG. 9, timings for entering image data signals for display via the source lines COLr, COLg, and COLb, and timings for reading out sensor outputs should be distinguished from each other. In the example shown in FIG. 9, a sensor output is read out using a horizontal blanking period or the like, after input of image data signals for display finishes in a horizontal scanning period. In other words, a constant voltage $V_{DD}$ is applied to the source line COLr after input of image data signals for display finishes.

The sensor column driver 4 includes a sensor pixel readout circuit 41, sensor column amplifier 42, and a sensor column scanning circuit 43 as shown in FIG. 5. To the sensor pixel readout circuit 41, a line SOUT (see FIG. 10) for outputting a sensor output $V_{SOUT}$ from the pixel region 1 is connected. In FIG. 5, a sensor output from a line SOUTj (j=1 to N) is denoted by $V_{SOUTj}$. The sensor pixel readout circuit 41 outputs a peak hold voltage $V_{Sj}$ of the sensor output $V_{SOUTj}$ to the sensor column amplifier 42. The sensor column amplifier 42 incorporates N column amplifiers that correspond to N columns of optical sensors in the pixel region 1, respectively. The sensor column amplifier 42 amplifies the peak hold voltage $V_{Sj}$ (j=1 to N) by each column amplifier, thereby outputting it as $V_{COUT}$ to the buffer amplifier 6. The sensor column scanning circuit 43 outputs a column select signal CSj (j=1 to N) to the sensor column amplifier 42 in order to connect the column amplifiers of the sensor column amplifier 42 sequentially to the output of the buffer amplifier 6.

Figure 10:
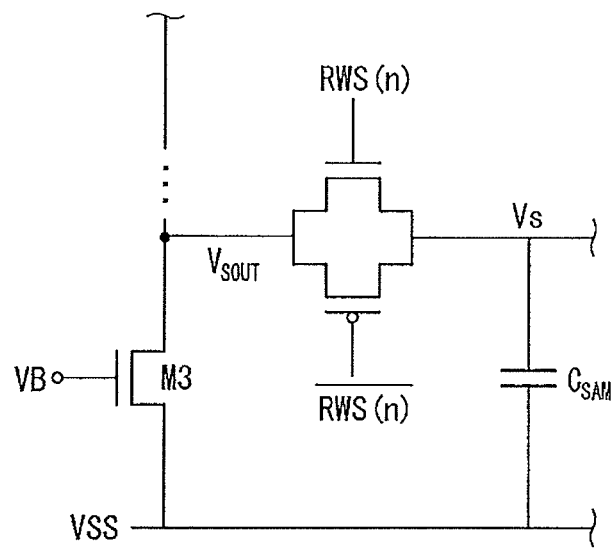
FIG. 10 is a circuit diagram showing an internal configuration in a sensor pixel readout circuit according to one embodiment of the present invention.
Figure 11:
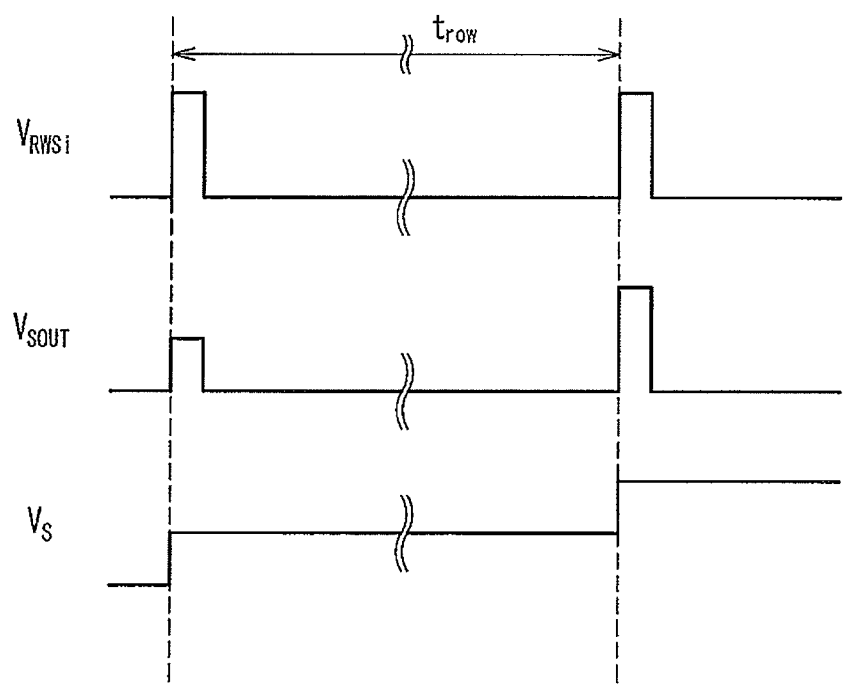
FIG. 11 is a waveform diagram showing a relationship among a readout signal, a sensor output, and an output of a sensor pixel readout circuit according to one embodiment of the present invention.

Here, an action of the sensor column driver 4 and the buffer amplifier 6 after the sensor output $V_{SOUT}$ is read out from the pixel region 1 is explained below, with reference to FIGS. 10 and 11. FIG. 10 is a circuit diagram illustrating an internal configuration of the sensor pixel readout circuit 41. FIG. 11 is a waveform diagram showing a relationship among the readout signal $V_{RWS}$, the sensor output $V_{SOUT}$, and an output $V_S$ of the sensor pixel readout circuit. As described above, when the readout signal rises to the high level $V_{RWS.H}$, the transistor M2 becomes conductive, whereby the transistors M2 and M3 form a source follower amplifier. This allows the sensor output $V_{SOUT}$ to be accumulated in a sample capacitor $C_{SAM}$ of the sensor pixel readout circuit 41. Therefore, after the readout signal falls to the low level $V_{RWS.L}$, an output voltage $V_S$ from the sensor pixel readout circuit 41 to the sensor column amplifier 42 is maintained at a level equal to a peak value of the sensor output $V_{SOUT}$ during a period ($t_{row}$) while the row concerned is selected, as shown in FIG. 11.

Figure 12:
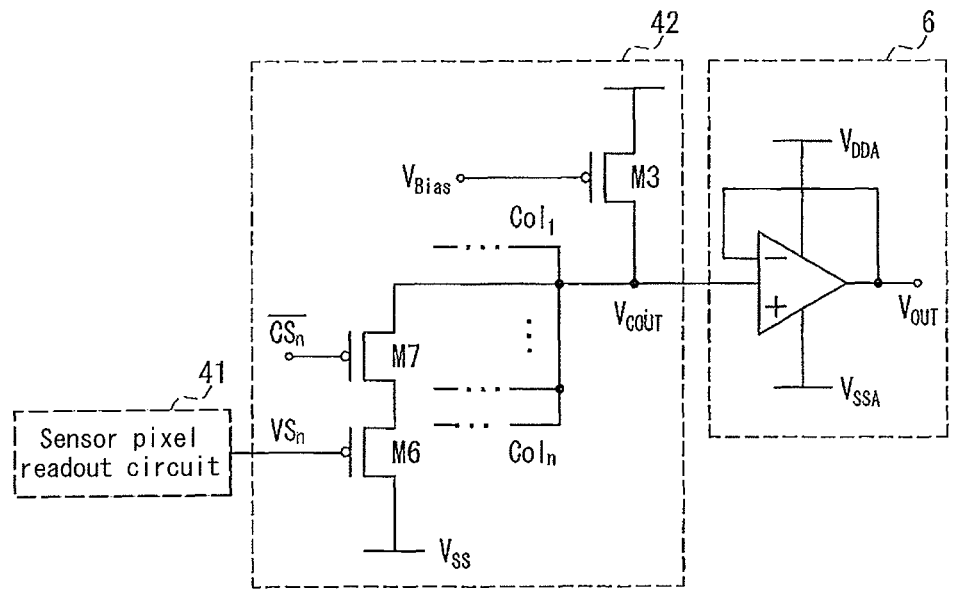
FIG. 12 is a circuit diagram showing an exemplary configuration of a sensor column amplifier according to one embodiment of the present invention.

Next, an action of the sensor column amplifier 42 is explained below, with reference to FIG. 12. As shown in FIG. 12, the respective output voltages $V_{Sj}$ (j=1 to N) of the columns are input from the sensor pixel readout circuit 41 to the N column amplifiers of the sensor column amplifier 42. As shown in FIG. 12, each column amplifier is composed of transistors M6 and M7. Column select signals CS, generated by the sensor column scanning circuit 43 become ON sequentially with respect to the N columns during a selection period ($t_{row}$) for one row, respectively, so that the transistor M6 of concerned one of the N column amplifiers in the sensor column amplifier 42 is turned on. Then, only concerned one of the output voltages $V_{Sj}$ (j=1 to N) of the columns is output via the transistor M6 concerned, as an output $V_{COUT}$ from the sensor column amplifier 42. The buffer amplifier 6 further amplifies $V_{COUT}$ output from the sensor column amplifier 42, and outputs the same as a panel output (optical sensor signal) $V_{out}$ to the signal processing circuit 8.

It should be noted that the sensor column scanning circuit 43 may scan the optical sensor columns one by one as described above, but the configuration is not limited to this. The sensor column scanning circuit 43 may have a configuration for performing interlaced-scanning of columns of the optical sensors. Alternatively, the sensor column scanning circuit 43 may be formed as a scanning circuit of multiphase driving, for example, four-phase driving.

With the above-described configuration, the display apparatus according to the present embodiment obtains a panel output $V_{OUT}$ according to an amount of light received by the photodiode D1 formed in each pixel in the pixel region 1. The panel output $V_{OUT}$ is sent to the signal processing circuit 8, is A/D converted there, and is accumulated in a memory (not shown) as panel output data. This means that the same number of sets of panel output data as the number of pixels (the number of the optical sensors) in the pixel region 1 are accumulated in this memory. The signal processing circuit 8 performs various types of signal processing operations such as image capture and detection of a touched region, using the panel output data accumulated in the memory. It should be noted that in the present embodiment, the same number of sets of panel output data as the number of pixels (the number of optical sensors) in the pixel region 1 are accumulated in the memory of the signal processing circuit 8, but the number of sets of panel output data accumulated therein is not necessarily the same as the number of pixels, with consideration to limitations such as a memory capacity.

A display apparatus according to Third Embodiment of the present invention is explained below. It should be noted that the members having the same functions as those of Second Embodiment explained above are denoted by the same reference numerals, and detailed explanations of the same are omitted.

Figure 13:
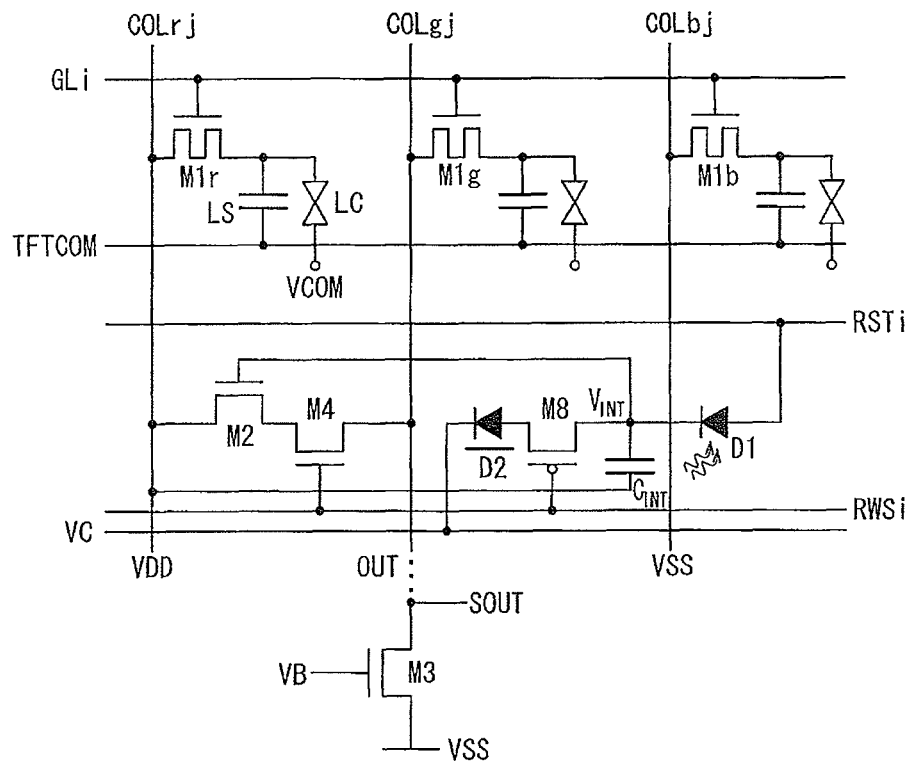
FIG. 13 is an equivalent circuit diagram showing a configuration of one pixel in a display apparatus according to one embodiment of the present invention.

FIG. 13 is an equivalent circuit diagram showing a configuration of one pixel in the display apparatus according to Third Embodiment. As shown in FIG. 13, an optical sensor of the display apparatus according to Third Embodiment further includes a thin-film transistor M4 (first switching element, second transistor), in addition to photodiodes D1 and D2, a capacitor $C_{INT}$ (accumulation capacitor), a thin-film transistor M2 (first switching element, first transistor), and a p-channel thin-film transistor M8.

In the optical sensor of the present embodiment, one of electrodes of the capacitor $C_{INT}$ is connected to between a cathode of the photodiode D1 and a drain of the p-channel thin-film transistor M8, and to a gate electrode of the thin-film transistor M2. The other electrodes of the capacitor $C_{INT}$ is connected to a line VDD (a line for supplying a constant voltage). Further, a drain of the thin-film transistor M2 is connected to the line VDD, and a source of the same is connected to a drain of the thin-film transistor M4. A gate of the thin-film transistor M4 is connected to a readout signal line RWS. A source of the thin-film transistor M4 is connected to a line OUT (output electric current readout line). It should be noted that this example has a configuration in which one of the electrodes of the capacitor $C_{INT}$ and the drain of the thin-film transistor M4 are both connected to the constant voltage line (line VDD), but the optical sensor may have a configuration in which these are connected to different constant voltage lines, respectively.

Figure 14:
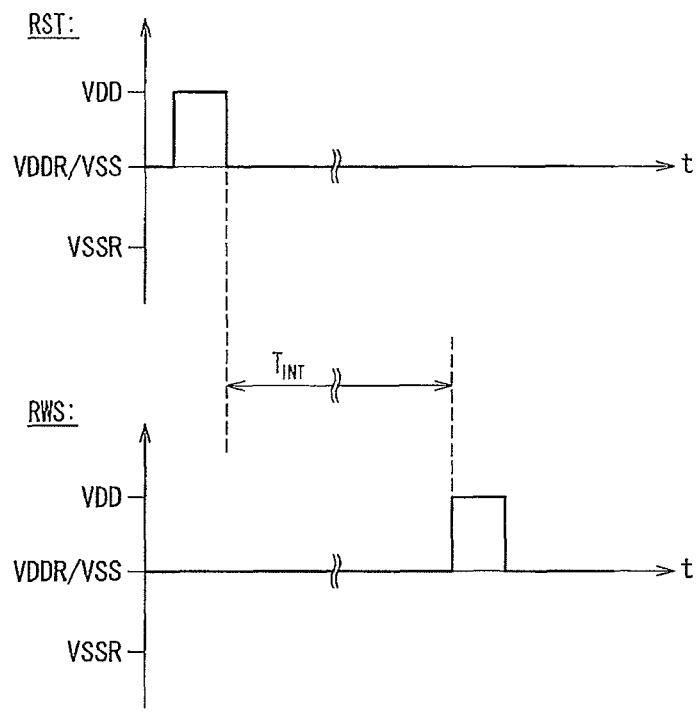
FIG. 14 is a timing chart showing respective waveforms of a reset signal supplied from a line RST to an optical sensor and a readout signal supplied from a line RWS to the optical sensor in a display apparatus according to one embodiment of the present invention.
Figure 15:
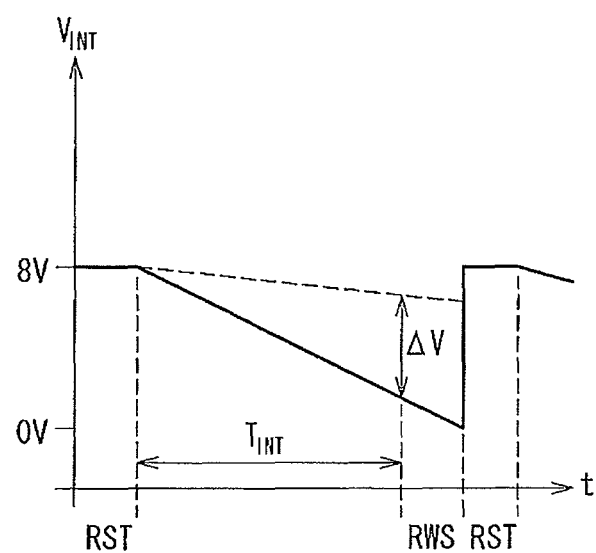
FIG. 15 is a waveform diagram showing a relationship between an input signal (RST, RWS) and $V_{INT}$ in an optical sensor according to one embodiment of the present invention.

Here, an action of the optical sensor according to the present embodiment is explained, with reference to FIGS. 14 and 15.

FIG. 14 is a timing chart showing waveforms of a reset signal supplied from a line RST to the optical sensor and a readout signal supplied from a line RWS to the optical sensor. FIG. 15 is a waveform diagram showing a relationship between input signals (RST, RWS) and $V_{INT}$ in the optical sensor according to Third Embodiment.

The high level $V_{RST.H}$ of the reset signal is set to a potential that causes the thin-film transistor M2 to be turned on. In the example shown in FIG. 14, the high level $V_{RST.H}$ of the reset signal is 8 V. The reset signal has a low level $V_{RST.L}$ of 0 V. In this example, the high level $V_{RST.H}$ of the reset signal is equal to $V_{DD}$, and the low level $V_{RST.L}$ thereof is equal to $V_{SS}$. Further, the high level $V_{RWS.H}$ of the readout signal is 8 V, and the low level $V_{RWS.L}$ thereof is 0 V. In this example, the high level $V_{RWS.H}$ of the readout signal is equal to $V_{DD}$, and the low level $V_{RWS.L}$ thereof is equal to $V_{SS}$.

First, when the reset signal supplied from the sensor row driver 5 to the line RST rises from the low level (0 V) to the high level (8 V), a forward bias is applied to the photodiode D1. Here, the transistor M2 is turned on, but since the readout signal RWS is at the low level and the transistor M4 is in an OFF state, no signal is output to the line OUT.

Next, when the reset signal returns to the low level $V_{RST.L}$, a photoelectric current integration period (period $T_{INT}$ shown in FIG. 15) starts. During the integration period, a reverse bias is applied to the photodiodes D1 and D2, whereby an electric current flows out of the capacitor $C_{INT}$; thus, the capacitor $C_{INT}$ is discharged. Here, the photodiode D1 allows a sum of a photoelectric current $I_{PHOTO}$ generated by incident light and a dark current $I_{DARK}$ to flow out of the accumulation node INT. On the other hand, the photodiode D2 allows a dark current $-I_{DARK}$ to flow out of the accumulation node INT. As a result, an electric current flowing out of the capacitor $C_{INT}$ to the accumulation node INT is substantially only an electric current corresponding to the photoelectric current $I_{PHOTO}$. During the integration period also, $V_{INT}$ falls from the reset potential (in this example, $V_{RST.H}$=8 V), depending on the intensity of incident light. However, since the transistor M4 is in an OFF state, no signal is output to the line OUT. It should be noted that the sensor circuit is desirably designed so that the sensor output is minimized in the case where light at the upper limit of illuminance to be detected is projected on the photodiode D1, i.e., the potential ($V_{INT}$) of the gate electrode of the transistor M2 in this case slightly exceeds the threshold value. In this design, when light having a luminance exceeding at the upper limit of illuminance to be detected is projected on the photodiode D1, the value of $V_{INT}$ falls to below the threshold value of the transistor M2, thereby turning the transistor M2 off. As a result, no signal is output to the line OUT.

When the integration period ends, as shown in FIG. 15, the readout signal RWS rises, whereby the readout period starts. When the readout signal RWS rises to the high level, the transistor M4 is turned on. This causes an output of the transistor M2 to be output to the line OUT via the transistor M4. Here, the transistor M2, together with the bias transistor M3 provided at en end of the line OUT at each column, functions as a source follower amplifier. In other words, an output signal voltage from the output line SOUT is equivalent to an integral of the photoelectric current $I_{PHOTO}$ generated by light incident on the photodiode D1 during an integration period.

It should be noted that in FIG. 15, the waveform indicated by the broken line represents variation of a potential $V_{INT}$ in the case where an amount of light incident on the photodiode D1 is small, and the waveform indicated by the solid line represents variation of the potential $V_{INT}$ in the case where external light is incident on the photodiode D1. $\Delta V$ in FIG. 15 indicates a potential difference proportional to an integral of the photoelectric current $I_{PHOTO}$ from the photodiode D1.

As described above, with the optical sensor according to the present embodiment also, an optical sensor output of each pixel can be obtained by cyclically performing initialization with a reset pulse, integration of a photoelectric current during the integration period, and readout of a sensor output during the readout period.

In other words, the optical sensor provided at each pixel in the display apparatus according to the present embodiment also discharges only an electric current corresponding to the photoelectric current $I_{PHOTO}$ of the photodiode D1 from the capacitor $C_{INT}$, as is the case with Second Embodiment. Therefore, irrespective of the magnitude of the dark current $I_{DARK}$, the intensity of the external light can be detected accurately. Further, since the dark current $I_{DARK}$ is not discharged from the capacitor $C_{INT}$, the dynamic range can be widened. This makes it possible to realize an optical sensor that is capable of detecting an intensity of external light with high precision, without being influenced by ambient temperature.

Figure 18:
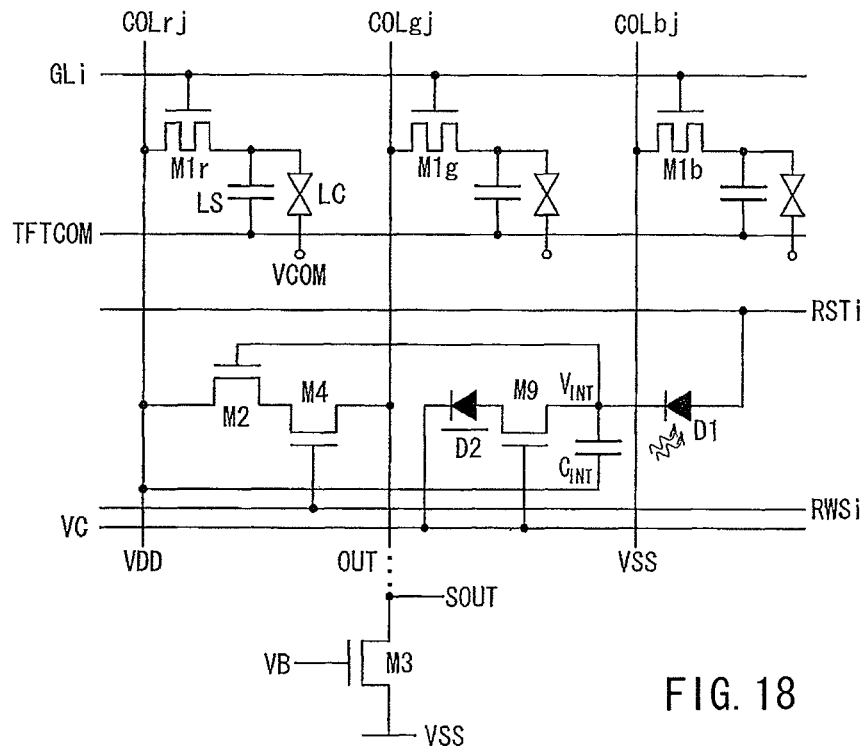
FIG. 18 is an equivalent circuit diagram showing one exemplary modification of a display apparatus according to one embodiment of the present invention.

In the present embodiment also, as shown in FIG. 18, an n-channel thin-film transistor M9 may be provided in place of the p-channel thin-film transistor M8. It should be noted that in the configuration shown in FIG. 18, it is necessary that the voltage of the reset signal RST has to be changed so that a forward bias should not be applied to the photodiode D2 during an accumulation period. In other words, p-channel TFTs are used as the transistors M2 and M3, while the drain of the transistor M2 is connected to VDD and the source of the transistor M3 is connected to VSS. It should be noted that driving waveforms of the reset signal RST and the readout signal RWS are identical to the waveforms shown in FIG. 7 in Second Embodiment.

It should be noted that the configuration shown in FIG. 18 is capable of resetting the accumulation node INT more correctly, irrespective of the value of $V_{RWS.L}$, in comparison with the configuration shown in FIG. 13, as explained in the description of Second Embodiment. Therefore, the configuration shown in FIG. 18 has an advantage of freely setting the value of $V_{RWS.L}$.

A display apparatus according to Fourth Embodiment of the present invention is explained below. It should be noted that the members having the same functions as those of the embodiments explained above are denoted by the same reference numerals, and detailed explanations of the same are omitted.

Figure 16:
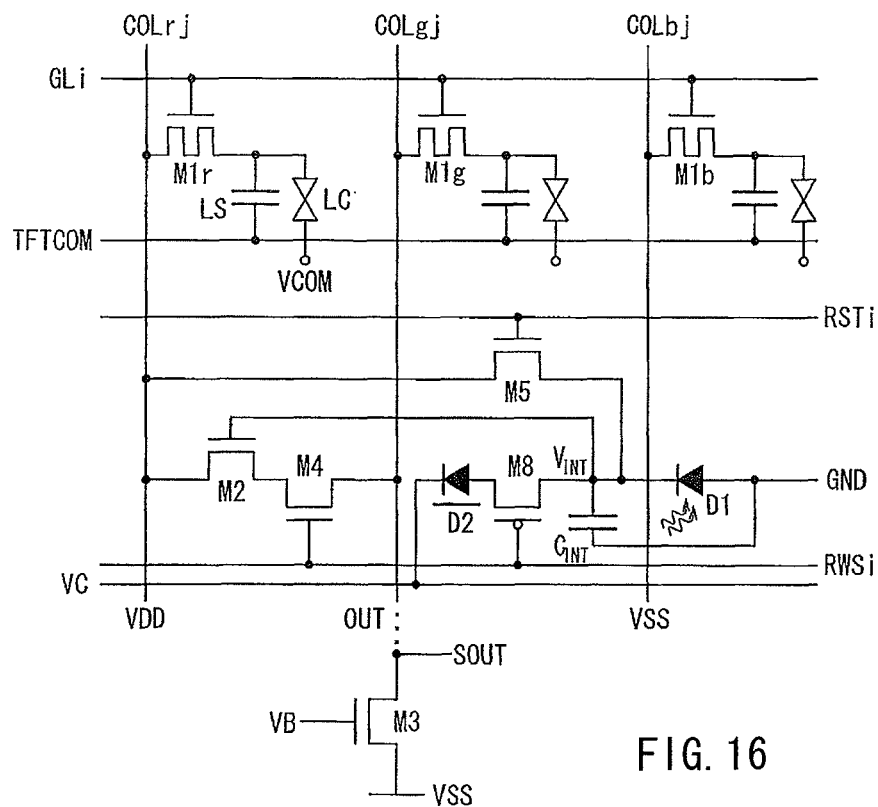
FIG. 16 is an equivalent circuit diagram showing a configuration of one pixel in a display apparatus according to one embodiment of the present invention.

FIG. 16 is an equivalent circuit diagram showing a configuration of one pixel in the display apparatus according to Fourth Embodiment. As shown in FIG. 16, an optical sensor of the display apparatus according to Fourth Embodiment includes photodiodes D1 and D2, a capacitor $C_{INT}$ (accumulation capacitor), a thin-film transistor M2 (first switching element, first transistor), thin-film transistor M4 (first switching element, second transistor), and a p-channel thin-film transistor M8. The optical sensor according to the present embodiment further includes a thin-film transistor M5 (first switching element, third transistor).

In the optical sensor according to the present embodiment, one of electrodes of the capacitor $C_{INT}$ is connected to a line between a cathode of the photodiode D1 and a drain of the p-channel thin-film transistor M8. The other electrode of the capacitor $C_{INT}$ is connected to GND (constant voltage line). It should be noted that the present embodiment may have a configuration in which the other electrode of the capacitor $C_{INT}$ is connected to a constant voltage line (VDD or VSS) other than GND.

Further, a gate of the thin-film transistor M2 is connected to a line between the cathode of the photodiode D1 and the drain of the p-channel thin-film transistor M8. A drain of the thin-film transistor M2 is connected to the line VDD, and a source thereof is connected to a drain of the thin-film transistor M4. A gate of the thin-film transistor M4 is connected to a readout signal line RWS. A source of the thin-film transistor M4 is connected to a line OUT (line for reading out an output electric current). A gate of the thin-film transistor M5 is connected to the reset signal line RST, and a drain thereof is connected to the line VDD (line for supplying a constant voltage). A source of the thin-film transistor M5 is connected to a line between a cathode of the photodiode D1 and the drain of the p-channel thin-film transistor M8. It should be noted that the present example shown herein has a configuration in which both of the drains of the thin-film transistors M4 and M5 are connected to the constant voltage line (line VDD) commonly, but alternatively may have a configuration in which they are connected to different constant voltages lines, respectively.

Here, an action of the optical sensor according to the present embodiment is explained below. It should be noted that in the optical sensor of the present embodiment, the waveform of the reset signal supplied from the line RST and the waveform of the readout signal supplied from the line RWS are identical to those in FIG. 14 referred to in Third Embodiment. The waveforms showing a relationship between the input signals (RST, RWS) and $V_{INT}$ in the optical sensor of the present embodiment are identical to those in FIG. 15 referred to in Third Embodiment. Therefore, as for the present embodiment also, the explanation is made with reference to FIGS. 14 and 15.

The high level $V_{RST.H}$ of the reset signal is set to a potential that causes the transistor M5 to be turned on. In the example shown in FIG. 14, the high level $V_{RST.H}$ of the reset signal is 8 V. The reset signal has a low level $V_{RST.L}$ of 0 V. In this example, the high level VEST. H of the reset signal is equal to $V_{DD}$, and the low level $V_{RST.L}$ thereof is equal to $V_{SS}$. Further, the high level $V_{RWS.H}$ of the readout signal is 8 V, and the low level $V_{RWS.L}$ thereof is 0 V. In this example, the high level $V_{RWS.H}$ of the readout signal is equal to $V_{DD}$, and the low level $V_{RWS.L}$ thereof is equal to $V_{SS}$.

First, when the reset signal supplied from the sensor row driver 5 to the line RST rises from the low level ($V_{RST.L}$=0 V) to the high level ($V_{RST.H}$=8 V), the transistor M is turned on. This causes the potential $V_{INT}$ at the junction point between the cathode of the photodiode D1 and the drain of the p-channel thin-film transistor M8 is reset to $V_{DD}$.

Next, when the reset signal returns to the low level $V_{RST.L}$, a photoelectric current integration period (period $T_{INT}$ shown in FIG. 15) starts. Here, the reset signal falls to the low level, thereby turning the transistor M5 off. Here, since the anode of the photodiode D1 has the same potential as GND and the potential of the cathode thereof is $V_{INT}$=$V_{DD}$=8 V, a reverse bias is applied to the photodiode D1. During the integration period, since a reverse bias is applied to the photodiodes D1 and D2 whereby an electric current flows out of the capacitor $C_{INT}$; thus, the capacitor $C_{INT}$ is discharged. Here, the photodiode D1 allows a sum of a photoelectric current $I_{PHOTO}$ generated by incident light and a dark current $I_{DARK}$ to flow out of the accumulation node INT. On the other hand, the photodiode D2 allows a dark current $-I_{DARK}$ to flow out of the accumulation node INT. As a result, an electric current flowing out of the capacitor $C_{INT}$ to the accumulation node INT is substantially only an electric current corresponding to the photoelectric current $I_{PHOTO}$. During the integration period also, $V_{INT}$ falls from the reset potential (in this example, $V_{RST.H}$=8 V), depending on the intensity of incident light. However, since the transistor M4 is in an OFF state, no signal is output to the line OUT. It should be noted that the sensor circuit is desirably designed so that the sensor output is minimized in the case where light at the upper limit of illuminance to be detected is projected on the photodiode D1, i.e., the potential ($V_{INT}$) of the gate electrode of the transistor M2 in this case slightly exceeds the threshold value. In this design, when light having a luminance exceeding the upper limit of luminance to be detected is projected on the photodiode D1, the value of $V_{INT}$ falls to below the threshold value of the transistor M2, thereby turning the transistor M2 off. As a result, no signal is output to the line OUT.

When the integration period ends, as shown in FIG. 15, the readout signal RWS rises, whereby the readout period starts. When the readout signal RWS rises to the high level, the transistor M4 is turned on. This causes an output of the transistor M2 to be output to the line OUT via the transistor M4. Here, the transistor M2, together with the bias transistor M3 provided at en end of the line OUT at each column, functions as a source follower amplifier. In other words, an output signal voltage from the output line SOUT is equivalent to an integral of the photoelectric current $I_{PHOTO}$ generated by light incident on the photodiode D1 during an integration period.

As described above, with the optical sensor of the present embodiment also, it is possible to obtain an optical sensor output of each pixel by cyclically performing initialization with a reset pulse, integration of a photoelectric current during the integration period, and readout of a sensor output during the readout period.

In other words, like in First and Third Embodiments, the optical sensor provided at each pixel in the display apparatus according to the present embodiment also discharges only an electric current corresponding to the photoelectric current $I_{PHOTO}$ of the photodiode D1 from the capacitor $C_{INT}$. Therefore, irrespective of the magnitude of the dark current $I_{DARK}$, the intensity of the external light can be detected accurately. Further, since the dark current $I_{DARK}$ is not discharged from the capacitor $C_{INT}$, the dynamic range can be widened. This makes it possible to realize an optical sensor that is capable of detecting an intensity of external light with high precision, without being influenced by ambient temperature.

Figure 19:
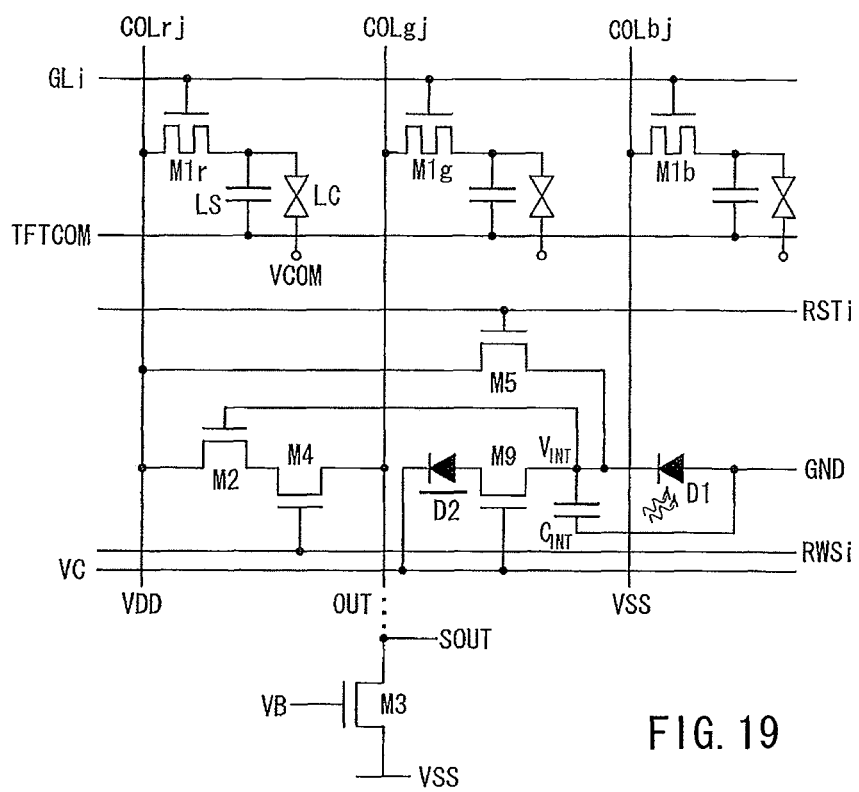
FIG. 19 is an equivalent circuit diagram showing one exemplary modification of a display apparatus according to one embodiment of the present invention.

In the present embodiment also, as shown in FIG. 19, an n-channel thin-film transistor M9 may be provided in place of the p-channel thin-film transistor M8. It should be noted that driving waveforms of the reset signal RST and the readout signal RWS are identical to the waveforms shown in FIG. 7 in First Embodiment.

It should be noted that the configuration shown in FIG. 19 is capable of resetting the accumulation node INT more correctly, irrespective of the value of $V_{RWS.L}$, in comparison with the configuration shown in FIG. 16, as explained in the description of Third Embodiment. Therefore, the configuration shown in FIG. 19 has an advantage of freely setting the value of $V_{RWS.L}$.

So far Second to Fourth Embodiments of the present invention have been explained, but the present invention is not limited to the above-described embodiments, and various modifications are possible within the scope of the present invention.

For example, configurations in which the lines VDD and OUT connected to the optical sensor are used also as the source lines COL are shown as configurations of Second to Fourth Embodiments. This configuration has an advantage of a higher pixel aperture ratio. However, with a configuration in which the lines VDD and OUT for the optical sensor are provided separately from the source lines COL, the same effects as those of Second and Third Embodiments described above can be obtained. Particularly in Third Embodiment, if the line VDD for the optical sensor is provided separately from the source lines COL and the transistor M2 and the capacitor $C_{INT}$ are connected to this line VDD, it is possible to achieve an advantage that the potential of the capacitor $C_{INT}$ is never destabilized by influences of video signals input to the source lines COL.

A display apparatus according to Fifth Embodiment of the present invention is explained below. It should be noted that the members having the same functions as those of the embodiments explained above are denoted by the same reference numerals, and detailed explanations of the same are omitted.

Figure 22:
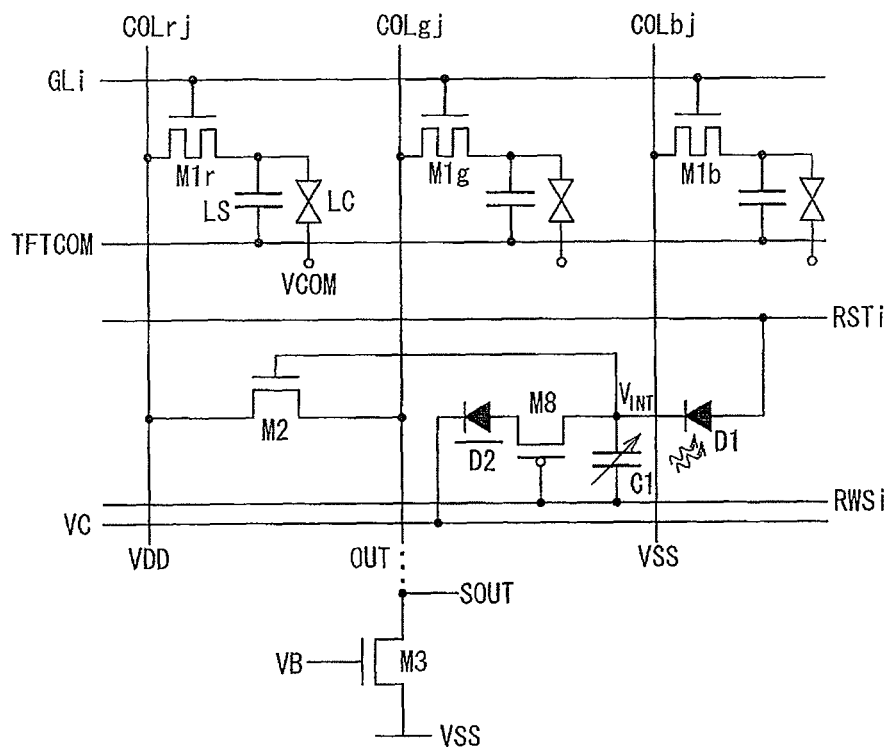
FIG. 22 is an equivalent circuit diagram showing a configuration of one pixel in a display apparatus according to one embodiment of the present invention.

FIG. 22 is an equivalent circuit diagram showing a configuration of one pixel in the display apparatus according to Fifth Embodiment. As shown in FIG. 22, an optical sensor of the display apparatus according to Fifth Embodiment includes the photodiodes D1 and D2, the thin-film transistor M2, and the p-channel thin-film transistor M8, which are shown in FIG. 6 for Second Embodiment, as well as a capacitor C1 (amplifying element) in place of the capacitor $C_{INT}$. It should be noted that the capacitor C1 functioning as an amplifying element in the present embodiment is a variable capacitor.

Figure 23:
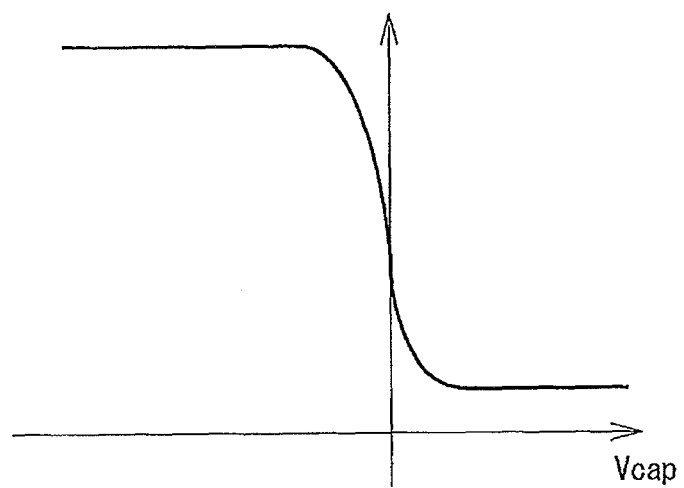
FIG. 23 is a CV characteristic diagram of a capacitor provided in an optical sensor according to one embodiment of the present invention.
Figure 24:
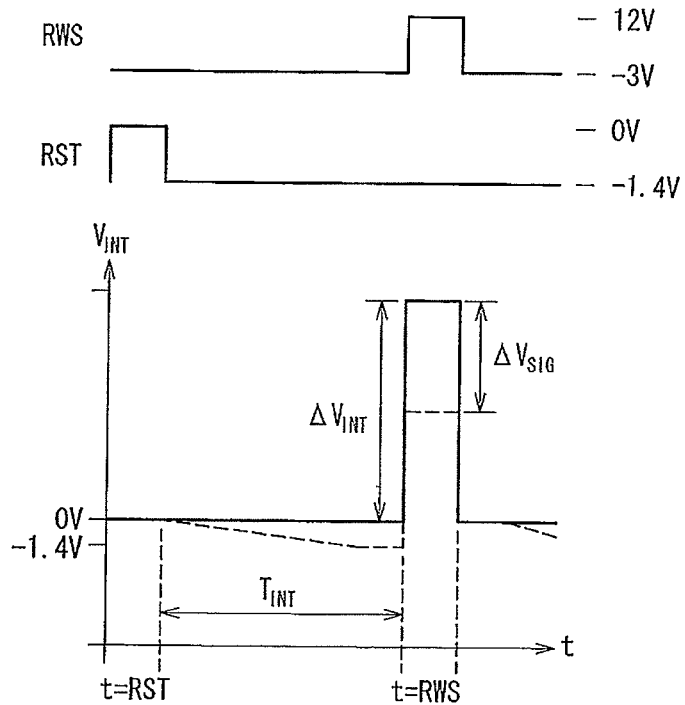
FIG. 24 is a timing chart showing a waveform of a driving signal and variation of a potential of an accumulation node in an optical sensor according to one embodiment of the present invention.

FIG. 23 is a CV characteristic diagram of the capacitor C1. In FIG. 23, the horizontal axis indicates an interelectrode voltage $V_{CAP}$ of the capacitor C1, and the vertical axis indicates an electrostatic capacitance. As shown in FIG. 23, the capacitor C1 is characterized in that it has an electrostatic capacitance that is constant when the interelectrode voltage $V_{CAP}$ is small, but exhibits a precipitous change immediately before and after the interelectrode voltage $V_{CAP}$ reaches a threshold value. Therefore, the characteristics of the capacitor C1 can be varied dynamically with a potential of a readout signal supplied from the line RWS. The use of the capacitor C1 having such characteristics allows the optical sensor according to the present embodiment to read out an amplified value of a change in the potential of the accumulation node during an integration period $T_{INT}$. The example shown in FIG. 24 is merely one embodiment, in which a low level $V_{RST.L}$ of the reset signal is –1.4 V, and the high level $V_{RST.H}$ of the reset signal is 0 V. The low level $V_{RWS.L}$ of the readout signal is –3 V, and the high level $V_{RWS.H}$ of the readout signal is 12 V. In FIG. 24, the waveform indicated by the solid line represents variation of the potential $V_{INT}$ in the case where light incident on the photodiode D1 is small in amount, and the waveform indicated by the broken line represents variation of the potential $V_{INT}$ in the case where light at a saturation level is incident on the photodiode D1. $\Delta V_{SIG}$ is a potential difference proportional to an amount of light incident on the photodiode D1. As is clear from FIG. 24, in the optical sensor according to the present embodiment, a change in the potential of the accumulation node during the integration period in the case where light at a saturation level is incident is smaller than that of a conventional optical sensor. The optical sensor according to the present embodiment, however, amplifies of the potential of the accumulation node and read it out during the readout period (the period while the potential of the readout signal is at the high level $V_{RWS.H}$).

Here, the readout of a sensor output from the pixel region 1 is explained with reference to FIG. 24. First, when the reset signal supplied from the sensor row driver 5 to the line RST rises from the low level ($V_{RST.L}$) to the high level ($V_{RST.H}$), a forward bias is applied to the photodiode D1. As a result, the potential $V_{INT}$ of the junction point INT has a value expressed by the following formula (1):

$$V_{INT} = V_{RST.H} - V_F \quad (1)$$

where $V_F$ represents a forward voltage of the photodiode D1. Since $V_{INT}$ herein is lower than the threshold voltage of the transistor M2, the transistor M2 is non-conductive during the reset period.

Next, when the reset signal returns to the low level $V_{RST.L}$, the photoelectric current integration period (Tim) starts. During the integration period $T_{INT}$, a photoelectric current proportional to an amount of light incident on the photodiode D1 flows out of the capacitor C1, whereby the capacitor C1 is discharged. This makes the potential $V_{INT}$ of the junction point INT at the end of the integration period $T_{INT}$ have a value expressed by the following formula (2):

$$V_{INT} = V_{RST.H} - V_F - \Delta V_{RST} \cdot C_{PD}/C_T - I_{PHOTO} \cdot t_{INT}/C_T \quad (2)$$

where $\Delta V_{RST}$ represents a height of a pulse of the reset signal ($V_{RST.H} - V_{RST.L}$); $I_{PHOTO}$ represents a photoelectric current of the photodiode D1; $t_{INT}$ represents a length of the integration period; $C_{PD}$ represents a capacitance of the photodiode D1; and $C_{TOTAL}$ represents a capacitance of an entirety of the optical circuit, that is, a total capacitance of the junction point INT, which is a sum of a capacitance $C_{INT}$ of the capacitor C1, a capacitance $C_{PD}$ of the photodiode D1, and a capacitance $C_{TFT}$ of the transistor M2. During the integration period also, since $V_{INT}$ is lower than the threshold voltage of the transistor M2, the transistor M2 is non-conductive.

After the integration period ends, the readout signal supplied to the line RWS rises, and the readout period starts. Here, injection of electric charges to the capacitor C1 occurs. When the potential $V_{INT}$ of the junction point INT becomes higher than the threshold voltage of the transistor M2, the transistor M2 becomes conductive. Then, the transistor M2, together with the bias transistor M3 provided at en end of the line OUT at each column, functions as a source follower amplifier. In the optical sensor according to the present embodiment, an output signal voltage from the output line SOUT from the drain of the transistor M3 is equivalent to a value obtained by amplifying an integral of the photoelectric current of the photodiode D1 during an integration period.

As described above, in the present embodiment, initialization with a reset pulse, integration of a photoelectric current during the integration period, and readout of a sensor output during the readout period, which are assumed to constitute one cycle, are performed cyclically.

Figure 25:
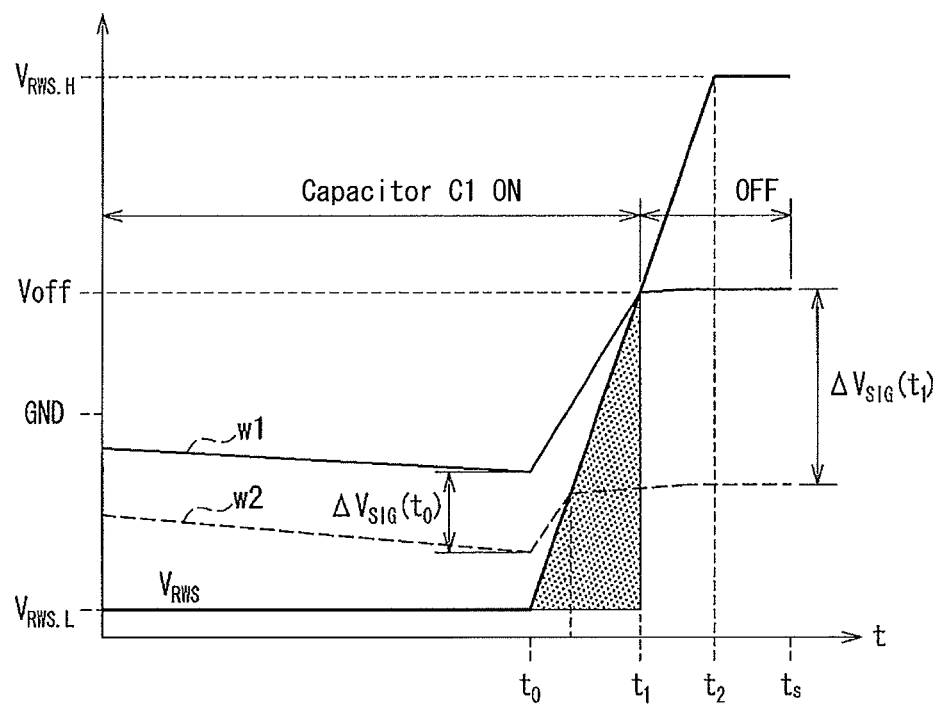
FIG. 25 is a waveform diagram showing variation of a potential $V_{INT}$ of an accumulation node from the end of an integration period to a readout period according to one embodiment of the present invention.

Here, a readout action of the optical sensor according to the present embodiment is explained below. FIG. 25 is a waveform diagram showing variation of the potential $V_{INT}$ of the accumulation node from the end of the integration period to the readout period. In FIG. 25, the waveform w1 indicated by a solid line represents variation of the potential $V_{INT}$ in the case where light incident on the photodiode D1 is small in amount. In FIG. 25, the waveform w2 indicated by the broken line represents variation of the potential $V_{INT}$ in the case where light is incident on the photodiode D1. The time to is a time at which the readout signal supplied from the line RWS starts rising from the low level $V_{RWS.L}$. The time t2 is a time at which the readout signal reaches the high level $V_{RWS.H}$. The time $t_S$ is a time at which the transistor M2 is turned on and sampling of a sensor output is carried out. The time $t_1$ is a time at which the readout signal reaches the threshold voltage $V_{off}$ of the capacitor C1. In other words, the capacitor C1 has action characteristics that are altered according to the magnitude relation between the potential supplied from the readout signal line RWS to a wide portion 111 and the threshold voltage $V_{off}$.

Figure 26A:
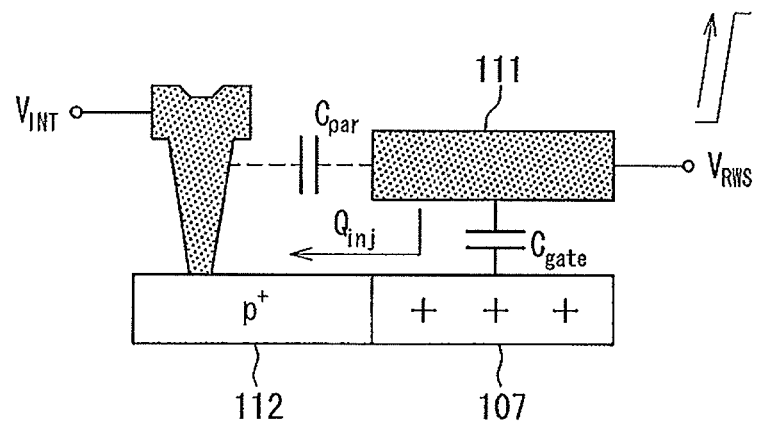
FIG. 26A is a cross-sectional schematic diagram showing transfer of charges when a potential of a gate electrode is lower than a threshold voltage in a capacitor of an optical sensor according to one embodiment of the present invention.
Figure 26B:
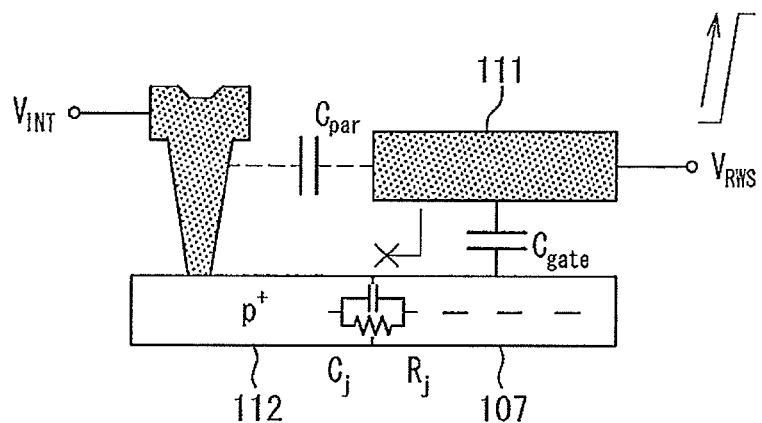
FIG. 26B is a cross-sectional schematic diagram showing transfer of charges when a potential of a gate electrode is higher than a threshold voltage in a capacitor of an optical sensor according to one embodiment of the present invention.

FIGS. 26A and 26B are cross-sectional schematic diagrams showing a difference in the transfer of charges due to the potential of the gate electrode (wide portion 111) in the capacitor C1. As shown in FIGS. 25, 26A, and 26B, the capacitor C1 is always in an ON state before the time $t_1$, and after the time $t_1$, the capacitor C1 is in an OFF state. In other words, while the potential of the line RWS is at or below the threshold voltage $V_{off}$, transfer of charges $Q_{inj}$ occurs under the gate electrode (wide portion 111) as shown in FIG. 26A. However, when the potential of the line RWS exceeds the threshold voltage $V_{off}$, there is no transfer of charges $Q_{inj}$ under the gate electrode (wide portion 111) as shown in FIG. 26B. As described so far, the potential $V_{INT}(t_s)$ of the accumulation node at a sampling time $t_s$ after the potential of the readout signal supplied from the readout signal line RWS reaches the high level $V_{RWS.H}$ is as expressed by the formula (3) shown below. It should be noted that $\Delta V_{INT}$ shown in FIG. 8 is equivalent to a difference between $V_{INT}(t_0)$ and $V_{INT}(t_s)$, which is equal to $Q_{inj}/C_{INT}$. Further, a reference numeral "112" shown in FIGS. 26A and 26B denotes a p+ region.

[Mathematical Formula 1]

$$\begin{aligned} V_{INT}(t_S) &= V_{INT}(t_0) + \frac{Q_{inj}}{C_{TOTAL}} \\ &= V_{INT}(t_0) + \int \frac{C_{INT}}{C_{TOTAL}} \cdot dV \\ &= V_{INT}(t_0) + \left[ \begin{array}{l} \int_{V_{RWS}(L)}^{V_{off}} \frac{C_{INT}}{C_{INT} + C_{TFT} + C_{DIODE}} \cdot dV + \\ \int_{V_{off}}^{V_{RWS}(H)} \frac{C'_{INT}}{C'_{INT} + C_{TFT} + C_{DIODE}} \cdot dV \end{array} \right] \end{aligned} \quad (3)$$

where $$C_{INT} = C_{par} + C_{gate}$$
$$C'_{INT} = C_{par} + \frac{C_{gate} \cdot C_j}{C_{gate} + C_j}$$

As shown in FIG. 24, in the optical sensor according to the present embodiment, $\Delta V_{SIG}(t_0)$ at the end of the integration period is amplified to $\Delta V_{SIG}(t_1)$. As a result, a potential difference after boosting is greater than a potential difference of the accumulation node due to a difference of illuminance on the light receiving face at the end of the integration period. For example, a difference between a potential of the accumulation node after the potential boosting during the readout period in the case of the dark state and a potential of the same in the case where light at a saturation level is incident is greater than a difference between a potential of the accumulation node at the end of the accumulation period in the case of the dark state and a potential of the same in the case where light at a saturation level is incident. Therefore, an optical sensor having a high sensitivity and a high S/N ratio can be realized.

It should be noted that in the configuration according to Fifth Embodiment has an advantage that, since the wide portion 111 of the line RWS functions also as a gate electrode of the capacitor C1, only a smaller contact is required as compared with, for example, Seventh Embodiment to be described later, which therefore makes it possible to downsizing the optical sensor. Further, in the configuration according to Fifth Embodiment, the wide portion 111 of the line RWS is located at such a position as to shield the accumulation node INT from the source line COL. Therefore, as compared with the configuration in which the source line COL is located above the accumulation node INT, this configuration has an advantage that noise interference by the source COL to the accumulation node INT can be suppressed.

Further, in the optical sensors according to First to Fourth Embodiments described above, the low level $V_{RWS.L}$ of the readout signal is set smaller than the high level $V_{RST.H}$ of the reset signal, and the voltage of the reference voltage line VC is set higher than the high level $V_{RST.H}$ of the reset signal. These sensors are driven by causing the p-channel thin-film transistor M8 to be in an ON state during the integration period after the supply of the reset signal RST, and by causing the p-channel thin-film transistor M8 to be in an OFF state during the readout period after the supply of the readout signal RWS. On the other hand, in the optical sensors shown as modifications of First through Fourth Embodiments described above, the voltage of the reference voltage line VC is set higher than the high level $V_{RST.H}$ of the reset signal, and the voltage of the readout signal is set arbitrary. These sensors are driven by causing the n-channel thin-film transistor M9 to be in an ON state during the integration period after the supply of the reset signal RST, and by causing the n-channel thin-film transistor M9 to be in an OFF state during the readout period after the supply of the readout signal RWS.

These driving conditions match the conditions for enhancing the sensitivity of the sensor in the present embodiment (e.g., FIG. 24). Therefore, the variable capacitor used in the present embodiment can be applied to any one of the above-described embodiments.

The following description explains Sixth Embodiment of the present invention. The members having the same functions as those of the embodiments explained above are denoted by the same reference numerals as those used in the above-described embodiments, and detailed explanations of the same are omitted.

A display apparatus according to the present embodiment has a configuration in which the optical sensor provided with the p-channel TFT (transistor M10) shown in FIG. 3 as an amplifying element, in place of the variable capacitor C1 of the optical sensor of Fifth Embodiment explained above, is used. It should be noted that the driving signal and the action of the optical sensor according to the present embodiment, which uses the transistor M10 as an amplifying element, are identical to those of Fifth Embodiment described above. Therefore, with the optical sensor according to the present embodiment also, it is possible to amplify the potential $V_{INT}$ of the accumulation node and read it out.

The following description explains Seventh Embodiment of the present invention. The members having the same functions as those of the embodiments explained above are denoted by the same reference numerals as those used in the above-described embodiments, and detailed explanations of the same are omitted.

Figure 27:
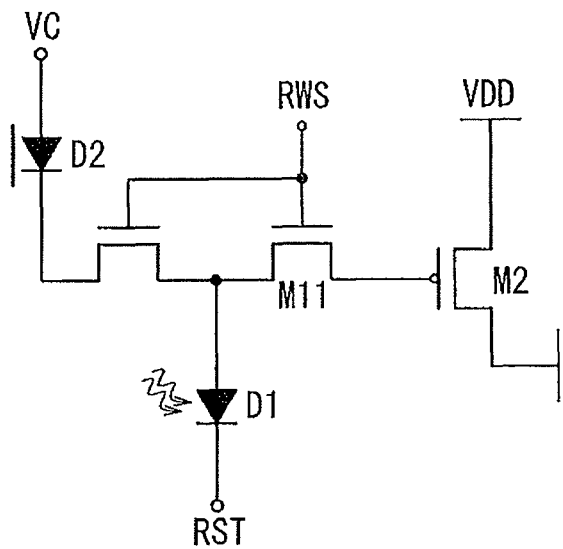
FIG. 27 is an equivalent circuit diagram of an optical sensor according to one embodiment of the present invention.

FIG. 27 is an equivalent circuit diagram of an optical sensor according to the present embodiment. The optical sensor according to the present embodiment uses an n-channel TFT (transistor M11) as an amplifying element. It should be noted that driving signals of the optical sensor of the present embodiment, in which an n-channel TFT is used as an amplifying element, have potentials of the high levels and the low levels that are opposite to those of the driving signals in Sixth Embodiment, in which the p-channel TFT is used as an amplifying element. With these driving signals, the optical sensor of the present embodiment is capable of amplifying the potential $V_{INT}$ of the accumulation node and reading it out, as explained above regarding Fifth Embodiment with reference to FIG. 25.

As shown in FIG. 27, in the optical sensor according to the present embodiment, the diode D1 is provided in an opposite direction as compared with Sixth Embodiment. In other words, the cathode of the diode D1 is connected to the line RST, and the anode thereof is connected to the n-channel TFT. Further, the transistor M2 for reading out is a p-channel TFT.

The following description explains Eighth Embodiment of the present invention. The members having the same functions as those of the embodiments explained above are denoted by the same reference numerals as those used in the above-described embodiments, and detailed explanations of the same are omitted.

Figure 28:
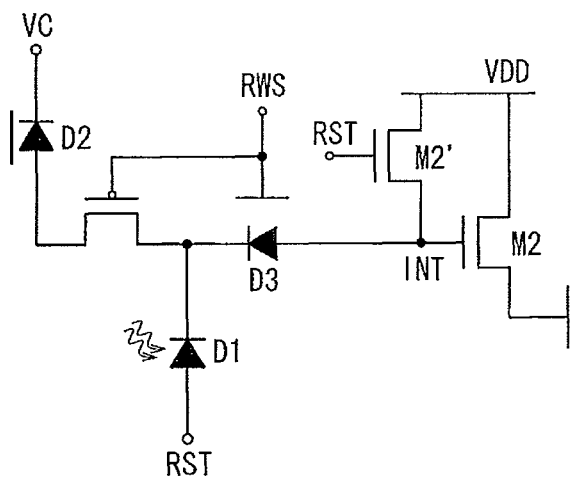
FIG. 28 is an equivalent circuit diagram of an optical sensor according to one embodiment of the present invention.

FIG. 28 is an equivalent circuit diagram of an optical sensor according to the present embodiment. Optical sensor according to the present embodiment is different from Embodiments described above in the point that a diode D3 is used as an amplifying element. It should be noted that the diode D3 used herein is a diode having a gate electrode on a channel. The diode D3, having the gate electrode on the channel region, boosts up a potential during a readout period with a capacitor formed between the foregoing gate electrode and an anode of the diode. As shown in FIG. 28, the optical sensor according to the present embodiment has a diode D3 that functions as an amplifying element. As shown in FIG. 28, a cathode (n-type semiconductor region) of the diode D3 is connected to a cathode of a diode D1 (n-type semiconductor region), and the anode (p-type semiconductor region) of the diode D3 is connected to an accumulation node INT.

In this configuration also, the potential $V_{INT}$ of the accumulation node can be amplified and read out as explained in the description of Sixth Embodiment as shown in FIG. 25, with the reset signal and the readout signal shown in FIG. 24 as explained in the description of Sixth Embodiment. It should be noted that the accumulation node INT is reset upon the supply of the reset signal to the gate of a transistor M2'.

The present invention is industrially applicable as a display apparatus having optical sensors in a pixel region of an active matrix substrate.

The invention claimed is:

1. An optical sensor comprising:
an accumulation node;
a reset signal line for supplying a reset signal to the accumulation node;
a readout signal line for supplying a readout signal to the accumulation node;
a photodetecting element that is connected to the accumulation node and through which an electric current flows according to an amount of received incident light;
a reference element that is connected to the photodetecting element via the accumulation node and that has a light-shielding layer with respect to incident light;
a first switching element that outputs a potential of the accumulation node in response to the readout signal, the potential of the accumulation node varying with the electric current flowing through the photodetecting element and an electric current flowing through the reference element during a sensing period from supply of the reset signal to supply of the readout signal; and
a second switching element that is provided between the accumulation node and the reference element, and that electrically separates the accumulation node and the reference element from each other when the potential of the accumulation node to which the readout signal is supplied is higher than a potential on a side of the reference element opposite to the accumulation node.

2. The optical sensor according to claim 1,
wherein the second switching element is a p-channel thin-film transistor, and
a control electrode of the second switching element is connected to the readout signal line.

3. The optical sensor according to claim 1,
wherein the second switching element is an n-channel thin-film transistor, and
a control electrode of the second switching element is connected to the side of the reference element opposite to the accumulation node.

4. The optical sensor according to claim 1, further comprising an accumulation capacitor having one of electrodes thereof connected to the accumulation node so as to charge/discharge output electric currents from the photodetecting element and the reference element.

5. The optical sensor according to claim 1, further comprising an amplifying element that amplifies the potential of the accumulation node in response to the readout signal.

6. The optical sensor according to claim 5,
wherein the amplifying element is a p-channel transistor provided between the accumulation node and the first switching element, and has a control electrode connected to the readout signal line.

7. The optical sensor according to claim 5, wherein the amplifying element is a variable capacitor having one of electrodes thereof connected to the accumulation node and the other electrode connected to the readout signal line.

8. The optical sensor according to claim 5, wherein the amplifying element is an n-channel thin-film transistor.

9. The optical sensor according to claim 5, wherein the amplifying element is a diode having a gate electrode on a channel.

10. The optical sensor according to claim 1, wherein an output electric current of the photodetecting element and an output electric current of the reference element are equal to each other when no light is incident thereon.

11. The optical sensor according to claim 1, wherein the photodetecting element and the reference element are photodiodes, and a length and a width of an interval region between a p-layer and an n-layer of one of the photodiodes are equal to a length and a width of that of the other photodiode, respectively.

12. The optical sensor according to claim 4,
wherein the first switching element is formed with one transistor, and
the readout signal line is connected to the other electrode of the accumulation capacitor.

13. The optical sensor according to claim 4,
wherein the first switching element is formed with a first transistor and a second transistor,
a control electrode of the first transistor is connected to the accumulation node,
one of two electrodes other than the control electrode of the first transistor is connected to a line for supplying a constant voltage,
the other one of the two electrodes other than the control electrode of the first transistor is connected to one of two electrodes other than a control electrode of the second transistor,
the control electrode of the second transistor is connected to the readout signal line,
the other electrode of the accumulation capacitor is connected to a line for supplying a constant voltage, and the other one of the two electrodes other than the control electrode of the second transistor is connected to a readout line for reading out the output electric current.

14. The optical sensor according to claim 4,
wherein the first switching element is formed with a first transistor, a second transistor, and a third transistor,
a control electrode of the first transistor is connected to the accumulation node,
one of two electrodes other than the control electrode of the first transistor is connected to a line for supplying a constant voltage,
the other one of the two electrodes other than the control electrode of the first transistor is connected to one of two electrodes other than a control electrode of the second transistor,
the other electrode of the accumulation capacitor is connected to a constant voltage line,
the control electrode of the second transistor is connected to the readout signal line,
the other one of the two electrodes other than the control electrode of the second transistor is connected to a readout line for reading out an output electric current,
a control electrode of the third transistor is connected to the reset signal line,
one of two electrodes other than the control electrode of the third transistor is connected to the accumulation node, and
the other one of the two electrodes other than the control electrode of the third transistor is connected to a line for supplying a constant voltage.

15. A display apparatus comprising the optical sensor according to claim 1 in a pixel region of an active matrix substrate.

* * * * *